United States Patent
Yip et al.

(10) Patent No.: US 11,363,330 B2
(45) Date of Patent: Jun. 14, 2022

(54) METHOD, APPARATUS AND COMPUTER-READABLE RECORDING MEDIUM FOR TRANSMITTING OR RECEIVING VPCC DATA

(71) Applicant: Samsung Electronics Co., Ltd., Suwon-si (KR)

(72) Inventors: Eric Yip, Suwon-si (KR); Jaehyeon Bae, Suwon-si (KR); Hyunkoo Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/034,814

(22) Filed: Sep. 28, 2020

(65) Prior Publication Data
US 2021/0099754 A1 Apr. 1, 2021

Related U.S. Application Data

(60) Provisional application No. 62/908,858, filed on Oct. 1, 2019.

(51) Int. Cl.
H04N 21/234 (2011.01)
H04N 21/4402 (2011.01)
H04N 21/647 (2011.01)

(52) U.S. Cl.
CPC ....... *H04N 21/4402* (2013.01); *H04N 21/234* (2013.01); *H04N 21/64746* (2013.01)

(58) Field of Classification Search
None
See application file for complete search history.

(56) References Cited

U.S. PATENT DOCUMENTS

| | | | | |
|---|---|---|---|---|
| 10,535,161 B2 * | 1/2020 | Budagavi | ............ | H04N 19/503 |
| 10,939,179 B2 * | 3/2021 | Park | ................ | H04N 21/435 |
| 2015/0381755 A1 * | 12/2015 | Li | .................. | H04L 67/2842 |
| | | | | 709/214 |
| 2016/0149994 A1 | 5/2016 | Kitazato | | |
| 2016/0373342 A1 * | 12/2016 | Kolan | ............ | H04L 45/24 |
| 2018/0115593 A1 | 4/2018 | Lee et al. | | |
| 2018/0302608 A1 | 10/2018 | Lee et al. | | |
| 2019/0069000 A1 | 2/2019 | Hou et al. | | |
| 2019/0222904 A1 * | 7/2019 | Park | ............ | H04N 21/26258 |

OTHER PUBLICATIONS

Jang et al. "Video-Based Point-Cloud-Compression Standard in MPEG: From Evidence Collection to Committee Draft", IEEE Signal Processing Magazine, May 2019, pp. 118-123, [retrieved from internet Aug. 16, 2021] (Year: 2019).*
Doohwan Kim et al., MPEG-DASH based 3D point cloud content configuration method, Journal of Broadcast Engineering, vol. 24, No. 4, pp. 660-669, Jul. 2019 pp. 661-663; and figure 1.
International Search Report dated Jan. 15, 2021, issued in International Application No. PCT/KR2020/013191.

* cited by examiner

*Primary Examiner* — William J Kim
(74) *Attorney, Agent, or Firm* — Jefferson IP Law, LLP

(57) ABSTRACT

A method and an apparatus for transmitting video-based point cloud contents (VPCC) data by a server are provided. The method includes generating moving picture experts group (MPEG) media transport protocol (MMTP) packets including at least one asset for the VPCC data, generating a signaling message including an asset group message about the at least one asset, and transmitting the MMTP packets and the signaling message to a client.

17 Claims, 19 Drawing Sheets

METHOD, APPARATUS AND COMPUTER-READABLE RECORDING MEDIUM FOR TRANSMITTING OR RECEIVING VPCC DATA

CROSS-REFERENCE TO RELATED APPLICATION(S)

This application is based on and claims priority under 35 U.S.C. § 119(e) of a U.S. provisional application Ser. No. 62/908,858, filed on Oct. 1, 2019, in the U.S. Patent and Trademark Office, the disclosure of which is incorporated by reference herein in its entirety.

BACKGROUND

1. Field

The disclosure relates to a method and an apparatus for transmitting multimedia content. More particularly, the disclosure relates to a method of transmitting or receiving video-based point cloud contents (VPCC) data using moving picture experts group (MPEG) media transport (MMT).

2. Description of the Related Art

In MPEG media transport (MMT), media data that builds a multimedia presentation is comprised of media processing units (MPUs) and an MMT package comprised of assets, which is a set of MPUs, and is transmitted or received in MMT protocol (MMTP) packets. An MPU needs to be a suitable International Organization for Standardization (ISO) base media file format (ISOBMFF) file generated according to an MMT standard.

Point cloud compression (PCC) is a new format of three dimensional (3D) media storage scheme for transmitting and storing 3D forms of media, and a video-based point cloud contents (VPCC) stream is comprised of VPCC components including two dimensional (2D) video-compressed streams of geometry, texture (or attribute) and an occupancy map.

An ISOBMFF file including VPCC may have a plurality of data tracks for one component type, and each of the plurality of data tracks for the one component type may be comprised of an independent asset stream. In this case, there is a need for defining an MMT signaling message for grouping asset streams.

The above information is presented as background information only to assist with an understanding of the disclosure. No determination has been made, and no assertion is made, as to whether any of the above might be applicable as prior art with regard to the disclosure.

SUMMARY

An international organization for standardization (ISO) base media file format (ISOBMFF) file including video-based point cloud contents (VPCC) may have a plurality of data tracks for one component type, and each of the plurality of data tracks for the one component type may be comprised of an independent asset stream, in which case there is a need to define a moving picture experts group (MPEG) media transport (MMT) signaling message for grouping asset streams.

Aspects of the disclosure are to address at least the above-mentioned problems and/or disadvantages and to provide at least the advantages described below. Accordingly, an aspect of the disclosure is to provide an MMT signaling message to group asset streams and an MMT signaling message for an MMT receiving entity to select an asset stream to receive and transmit (feedback) the selected asset stream to an MMT transmitting entity, thereby allowing the MMT transmitting entity and the MMT receiving entity to process MMT protocol (MMTP) packets according to the respective signaling messages.

Additional aspects will be set forth in part in the description which follows and, in part, will be apparent from the description, or may be learned by practice of the presented embodiments.

Example configurations of the disclosure to accomplish the above-described objective are as follows.

In accordance with an aspect of the disclosure, a method, performed by a server, of transmitting VPCC data is provided. The method includes generating MMTP packets including at least one asset for the VPCC data, generating a signaling message including an asset group message about the at least one asset, and transmitting the MMTP packets and the signaling message to a client.

The asset group message may include at least one of Information about the number of at least one asset group, identification information of each of the at least one asset group, information about the number of at least one asset included in each of the at least one asset group, presentation time information of each of the at least one asset group, data type information of each of the at least one asset included in each of the at least one asset group, transmission state information of each of the at least one asset included in each of the at least one asset group, transmission time information of a first MMTP packet including a first MMT processing unit (MPU) of each of the at least one asset group, or identification information of each of the at least one asset included in each of the at least one asset group.

The method may further include receiving a signaling message including an asset selection message from the client.

The asset selection message may include at least one of information about the number of at least one selected asset group, identification information of each of the at least one selected asset group, switching mode information of each of the at least one selected asset group, information about the number of at least one switching target asset determined according to the switching mode, or identification information of at least one switching target asset.

The method may further include delivering MMTP packets including an asset requested for transmission, based on the asset selection message and the asset group message.

In accordance with another aspect of the disclosure, a method, performed by a client, of receiving VPCC data is provided. The method includes receiving MMTP packets including at least one asset for the VPCC data and a signaling message including an asset group message about the at least one asset from a server, and processing the MMTP packets based on the signaling message.

The method may further include determining whether to update a packet process pipeline, based on the asset group message, when the packet process pipeline is determined to be updated, the method further comprising updating the packet processing pipeline, receiving new MMTP packets through the updated packet processing pipeline, and processing the received new MMTP packets, based on the updated packet processing pipeline.

The method may further include transmitting a signaling message including an asset selection message to the server.

The method may further include receiving MMTP packets including an asset selected based on the asset selection message.

In accordance with another aspect of the disclosure, an apparatus for transmitting VPCC data is provided The apparatus includes a communicator, at least one memory storing one or more instructions, and at least one processor executing the one or more instructions, wherein the at least one processor is configured to generate MMTP packets including at least one asset for the VPCC data, and generate a signaling message including an asset group message about the at least one asset, and control the communicator to transmit the MMTP packets and the signaling message to a client.

The at least one processor is further configured to control the communicator to receive a signaling message including an asset selection message from the client.

In accordance with another aspect of the disclosure, an apparatus for receiving VPCC data is provided. The apparatus includes a communicator, at least one memory storing one or more instructions, and at least one processor executing the one or more instructions, wherein the at least one processor is configured to control the communicator to receive MMTP packets including at least one asset for the VPCC data and a signaling message including an asset group message about the at least one asset from a server, and process the MMTP packets based on the signaling message.

The processor may be further configured to generate a signaling message including an asset selection message, and the communication device be further configured to transmit the asset selection message to the server.

In accordance with another aspect of the disclosure, a computer-readable recording medium having recorded thereon computer programs for performing the aforementioned method is provided.

In addition, other methods, other systems, and a computer-readable recording medium having recorded thereon computer programs for performing the method are provided to implement the disclosure.

Configurations of the disclosure to accomplish the purpose are as follows a method, performed by a server, of transmitting VPCC data includes generating MMTP packets including at least one asset for the VPCC data, generating a signaling message including an asset group message about the at least one asset, and transmitting the MMTP packets and the signaling message to a client.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
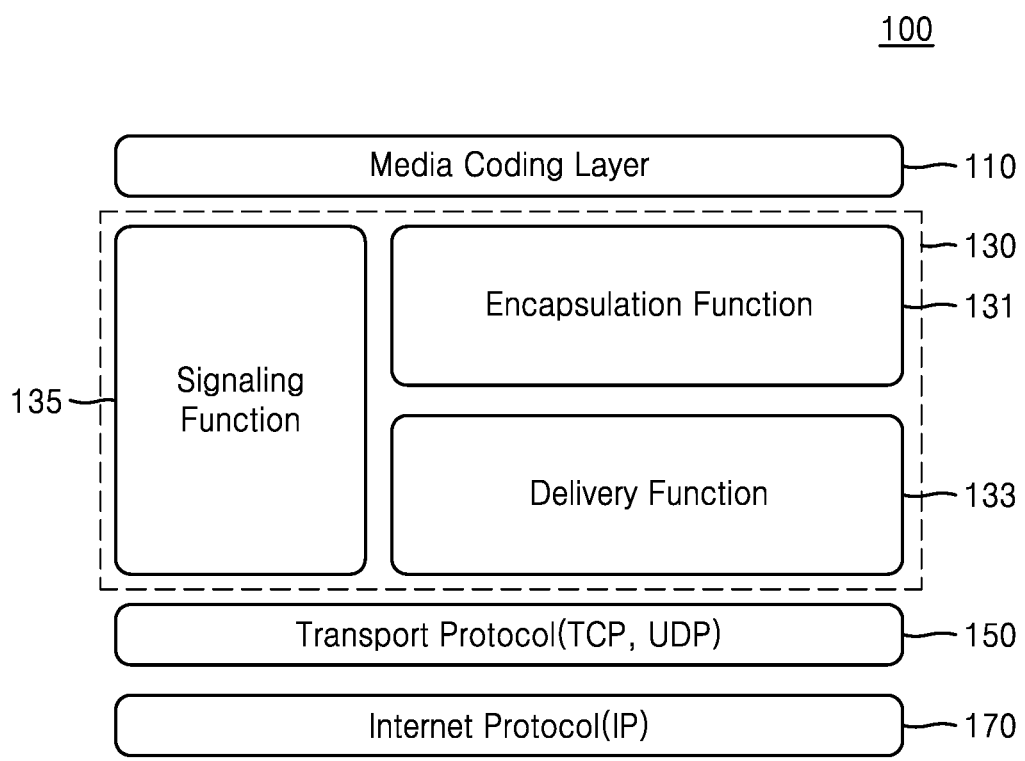
FIG. 1 illustrates a hierarchical architecture for moving picture Experts Group (MPEG) media transport (MMT) transmission according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Technological content well-known in the art or not directly related to the disclosure is omitted in the following description. Through the omission of content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for attaining them will be understood more clearly with reference to the following embodiments of the disclosure, which will be described in detail later along with the accompanying drawings. The embodiments of the disclosure may, however, be embodied in many different forms and should not be construed as limited to the embodiments set forth herein. Rather, these embodiments of the disclosure are provided so that this disclosure will be thorough and complete, and will fully convey the scope of the embodiments of the disclosure to those of ordinary skill in the art. Like numbers refer to like elements throughout the specification.

Throughout the disclosure, the expression "at least one of a, b or c" indicates only a, only b, only c, both a and b, both a and c, both b and c, all of a, b, and c, or variations thereof.

A terminal may include a user equipment (UE), a mobile station (MS), a cellular phone, a smart phone, a computer, or a multimedia system capable of performing a communication function.

In the disclosure, a controller may also be referred to as a processor.

In the disclosure, a layer (or a layer apparatus) may also be referred to as an entity.

It may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide operations for performing functions described in the block(s) of the flowchart.

Furthermore, each block may represent a part of a module, segment, or code including one or more executable instructions to perform particular logic function(s). It is noted that the functions described in the blocks may occur out of order in alternate embodiments of the disclosure. For example, two successive blocks may be performed substantially at the same time or in reverse order.

Furthermore, the term 'unit' or 'module' as herein used refers to a software or hardware component, such as field programmable gate array (FPGA) or application specific integrated circuit (ASIC) which plays a certain role. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a less number of components and modules, or further divided into a more number of components and modules. Moreover, the components and modules may be implemented to execute one or more central processing units (CPUs) in a device or security multimedia card. In embodiments of the disclosure, the module may include one or more processors.

Functions related to artificial intelligence (AI) according to embodiments of the disclosure are operated through a processor and a memory. There may be one or more processors. The one or more processors may include a universal processor, such as a central processing unit (CPU), an application processor (AP), a digital signal processor (DSP), and the like, a dedicated graphic processor, such as a graphics processing unit (GPU), a vision processing unit (VPU), and the like, or a dedicated AI processor, such as a neural processing unit (NPU). The one or more processors may control processing of input data according to a predefined operation rule or an AI model stored in the memory. When the one or more processors are the dedicated AI processors, they may be designed in a hardware structure that is specific to dealing with a particular AI model.

The predefined operation rule or the AI model may be made by learning. Specifically, the predefined operation rule or the AI model being made by learning refers to the predefined operation rule or the AI model established to perform a desired feature (or an object) being made when a basic AI model is trained by a learning algorithm with a lot of training data. Such learning may be performed by a device itself in which AI is performed according to the disclosure, or by a separate server and/or system. Examples of the learning algorithm may include supervised learning, unsupervised learning, semi-supervised learning, or reinforcement learning, without being limited thereto.

The AI model may include a plurality of neural network layers. Each of the plurality of neural network layers may have a plurality of weight values, and perform neural network operation through operation between an operation result of the previous layer and the plurality of weight values. The plurality of weight values of the plurality of neural network layers may be optimized by learning results of the AI model. For example, the plurality of weight values may be updated to reduce or minimize a loss value or a cost value obtained by the AI model during a learning procedure. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, without being limited thereto.

The disclosure will now be described with reference to accompanying drawings.

A moving picture experts group 2 (MPEG-2) transport stream (TS) standard established by the MPEG is a technology for transmitting multimedia streams in real time over wired/wireless networks, which is not suitable for high-capacity data transmission using internet protocol (IP) based heterogeneous networks because the MPEG-2 TS standard uses a multiplexing structure and relatively short fixed packet length optimized for a single network. Hence, for a new multimedia delivery standard, MPEG media transport (MMT) was established to support heterogeneous networks and multi-device services while enhancing advantages of the MPEG2-TS.

FIG. 1 illustrates a hierarchical architecture for MMT transmission according to an embodiment of the disclosure.

Referring to FIG. 1, an MMT architecture 100 may include a media coding layer 110, an MMT protocol (MMTP) layer 130, a transport protocol layer 150, and an IP layer 170, and a functional area of the MMTP layer 130 may include an encapsulation function 131, a delivery function 133, and a signaling function 135.

The MMTP is an application layer protocol optimized for real-time streaming of an ISOBMFF file in a unidirectional network, having characteristics, such as 1) media-aware packetization of the ISOBMFF file, 2) multiplexing of various media components using a single MMTP session, 3) removal of jitter occurring in a transport network, 4) providing a buffer model to prevent buffer overflow/underflow in a receiving entity, and 5) detection of a missing packet in the transport procedure.

The media encoding layer 110, the transport protocol layer 150, and the IP layer 170 are defined in other standards than MMT, and the MMT standard defines the encapsulation function 131, the delivery function 133, and the signaling function 135 of the MMT protocol layer 130 for transmission and consumption of multimedia in an IP based environment. Each of the functions may be implemented in each layer.

The encapsulation function 131 is responsible for collecting encoded multimedia content fragments and encoding them into a package having a structure of a format defined in the standard. An encoded file format supports a media processing unit (MPU), which is an ISOBMFF based media data container.

A procedure of processing an MPU in an MMT device includes encapsulation or decapsulation, and packetization or depacketization of media data in an MPU unit.

In the MMT standard, a content corresponding to an event (program) according to the advanced television systems committee (ATSC) standard or a content during some time interval to be delivered on a program channel is called a package. An actual MMT standard only contains regulations required to deliver a single package.

An MMT package may include one or more assets, presentation information (PI) describing temporal-spatial relationships between assets, and asset delivery characteristics (ADC) that includes delivery-related information.

An asset may refer to a set of media data that builds a multimedia presentation, and there are one or more MPUs having the same asset identifier (asset ID) included in an asset. In an asset, each of the MPUs includes non-overlapping asset fragments. In other words, two different consecutive MPUs do not include the same media sample.

The MPU is defined in the MMT standard compliant with an 'mpuf' brand of the ISOBMFF, and it is possible to independently reproduce the MPU because the MPU includes initialization information and metadata required to decode media data included in the MPU. The MPU also includes an asset ID to identify a media component included in the MPU, and an MPU sequence number to distinguish each of MPUs having the same asset ID. The asset ID is a globally unique ID, with which to identify a media component regardless of a service or transport protocol, enabling flexible service configuration.

In other words, an MPU may be specified with an asset identifier and an MPU sequence number. The asset ID is an ID of an asset including data contained in the MPU, and the MPU sequence number indicates an MPU sequence in the asset including the MPU. A first MPU in the asset may have the MPU sequence number of '0', but there are no limitations on the MPU sequence number as long as the MPU sequence number is determined to match the MPU sequence in the asset. For example, two different MPUs included in an asset have the same asset identifier while having different MPU sequence numbers.

An encapsulation layer to implement the encapsulation function 131 may be subdivided into E.3, E.2, and E.1 (not shown). The media coding layer 110 compresses media, such as video, audio, and the like, and sends the compressed media down to the E.3 encapsulation layer.

A unit of input to the E.3 layer is e.g., for video, a video access unit (AU) that compresses a full frame or a slice corresponding to part of the video AU unit. Video AUs or slices are combined into a group of pictures (GOP), which is compressed data across a number of frames, and then finally configured into an ISOBMFF. A data unit (MPU) output from the E.3 layer has file length determined depending on an application.

The E.2 layer corresponds to a conceptual process, which serves to configure an MMT asset by collecting a set of MPUs.

The E.1 layer corresponds to another conceptual process, which serves to configure an MMT package as a content that may be consumed by the user by collecting media assets, such as video assets, audio assets, and the like, and their transport characteristics (TC). The TC is a kind of metadata that collects characteristics of an asset to be considered or considerable to deliver the asset, referring not to information about characteristics of a transport network but to information about unique characteristics of the asset, i.e., the media content itself.

In summary, the E.3 layer serves to generate and output an MPU from input media, the E.2 layer serves to configure an MMT asset by collecting MPUs, and the E.1 layer serves to configure an MMT package using the MMT asset, PI, and ADC.

The delivery function 133 serves to divide and carry a package into MMTP packets having a size that matches a maximum transmission unit (MTU) of the transport network.

Data input to the delivery layer corresponds to MPUs and TC of an asset to which the MPUs belong. In the delivery layer, when an MPU is larger in size than an MTU, the MPU is fragmented and carried on MMTP packets. On the other hand, when several MPUs are smaller in size than an MTU, the MPUs are aggregated and carried on MMTP packets.

The delivery layer to implement the delivery function 133 may be subdivided into D.2 and D.1 (not shown). The D.1 layer determines some of segmented MPU or aggregated MPUs to be a payload, attaches an MMTP payload header to the payload, and sends it down to the D.2 layer. The D.2 layer finally completes an MMTP packet by attaching an MMPT header to data received from the D.1 layer, and sends the MMTP packet down to a lower layer, i.e., the transport protocol layer (or transport control protocol (TCP)/user datagram protocol (UDP) layer) 150.

MMT defines a hypothetical receiving entity buffer model (HRBM), which is a similar model to a transport stream system target decoder (T-STD) for MPEG-2 TS. The HRBM is defined in assets, such as video, audio, and the like, and may reliably provide a service by emulating status of a receiving entity buffer and controlling MMTP packet transport intervals to prevent the receiving entity buffer from overflowing or being emptied in an MMT server. Information for HRBM operation is delivered in an MMT signaling message.

The signaling function 135 serves to deliver control information required to consume a package received at a receiving end and control information required to efficiently deliver MMTP packets in a transport network, or deliver transport function parameters required to obtain multimedia compression data from MMTP packets received at the receiving end.

The MMT signaling message defines information to be shared by the transmitting entity and the receiving entity. The MMT signaling message may be classified into signaling for efficient packet transmission and signaling for media consumption according to usage. For efficient transmission and quick processing, the MMT signaling message is commonly provided in a binary format. A signaling message may be configured with extensible markup language (XML) documents for an application service for which scalability is important, and schemas of the XML documents are provided in the MMT standard.

Figure 2:
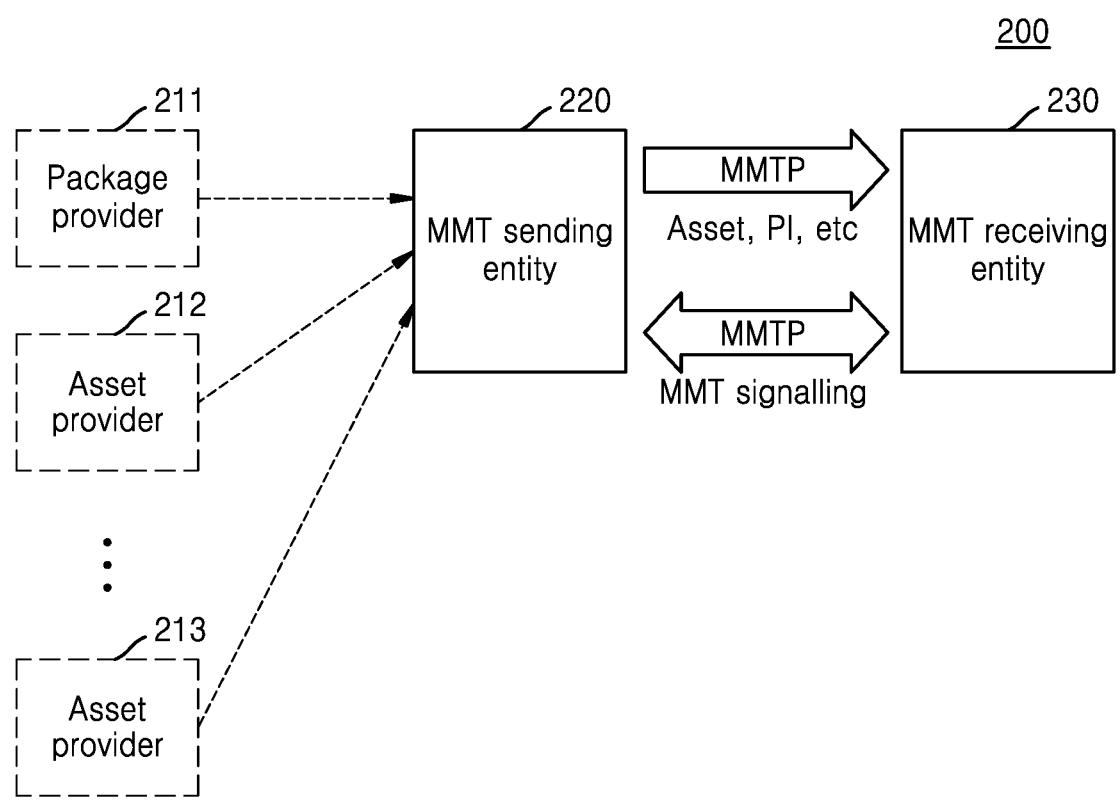
FIG. 2 illustrates an end-to-end structure of an MMT system according to an embodiment of the disclosure.

FIG. 2 illustrates an end-to-end structure of an MMT system according to an embodiment of the disclosure.

Referring to FIG. 2, an end-to-end structure 200 of MMT may include media content providers 211, 212, and 213, an MMT transmitting entity 220, and an MMT receiving entity 230.

The MMT transmitting entity 220 may be implemented by a server, and throughout this specification, the MMT transmitting entity 220 may be referred to as a server, a transmitting entity, a transmitter, or a transmitting end. The MMT receiving entity 230 may be implemented by a terminal, and in this specification, the MMT receiving entity 230 may be referred to as a terminal, a client, a receiver, or a receiving end.

The MMT transmitting entity 220 transmits an MMT package to the MMT receiving entity 230 through an MMTP packet flow. The MMT transmitting entity 220 may collect contents from the content provider based on presentation information (PI) of a package provided by the package providers 211, 212 and 213.

In an embodiment of the disclosure, the package provider and the content provider may be co-located. Media contents may be provided in assets divided into a series of encapsulated MMT processing units that form an MMTP packet flow. Such an MMTP packet flow may be generated using associated asset TC information, i.e., ADC. The MMT signaling message is used to manage delivery and consumption of an MMT package.

Figure 3:
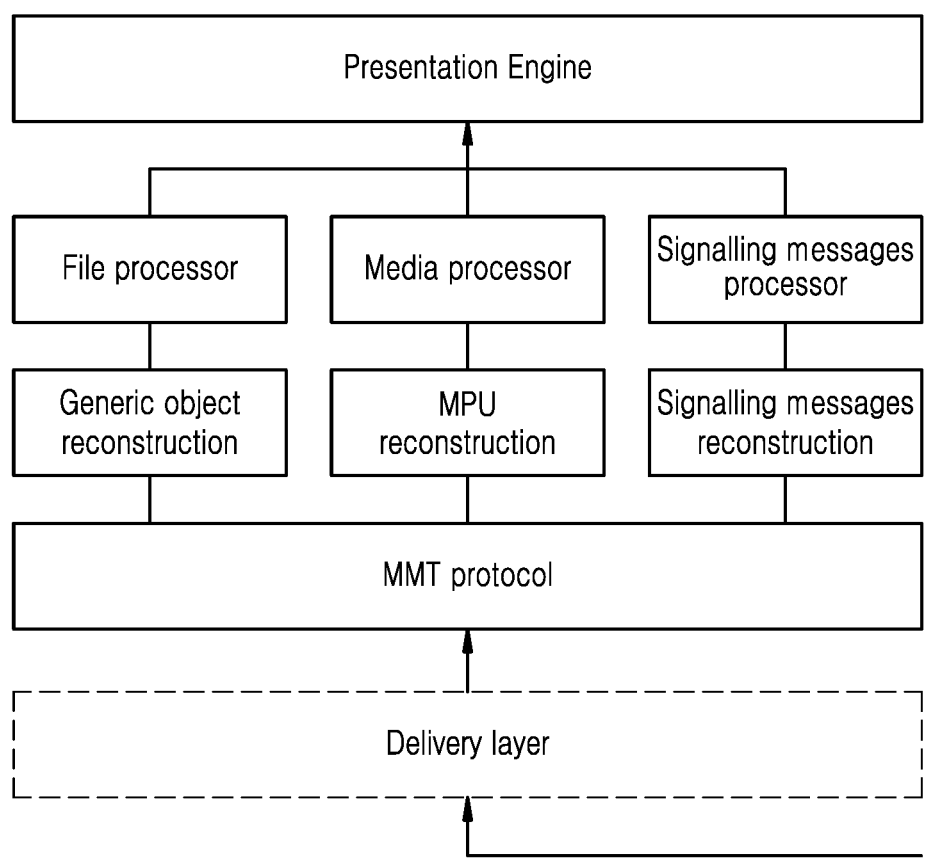
FIG. 3 illustrates a structure of an MMT receiving entity according to an embodiment of the disclosure.

FIG. 3 illustrates a structure of an MMT receiving entity according to an embodiment of the disclosure.

Referring to FIG. 3, an MMT receiving entity 300 may perform file processing, media processing, and signaling message processing and perform presentation of media contents through a presentation engine, based on assets, PI, ADC and an MMT signaling message included in the package received from the MMT transmitting entity.

The MMT receiving entity 300 may operate in one or more MMT functional areas.

An MMT protocol is used to receive and demultiplex streaming media based on packet_id and a payload type. A de-capsulation procedure differs by delivery and payload type to be separately processed (not shown).

The presentation engine layer serves to configure a multimedia scene and refer to contents received using the MMT protocol.

Figure 4:
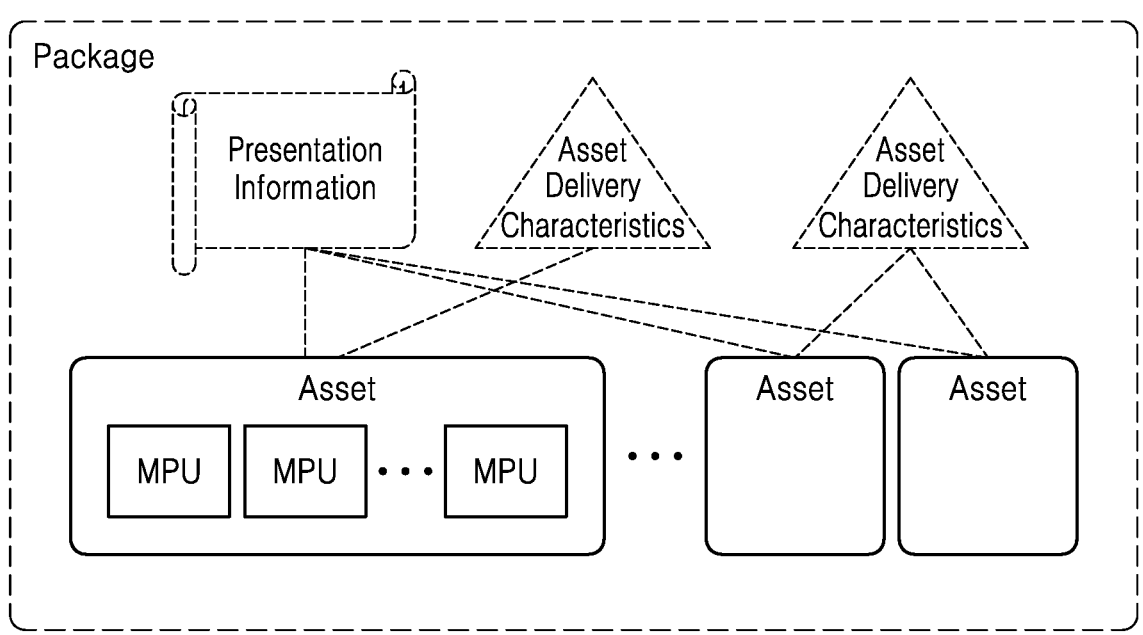
FIG. 4 illustrates a configuration of a package according to an embodiment of the disclosure.

FIG. 4 illustrates a configuration of a package according to an embodiment of the disclosure.

Referring to FIG. 4, a package 400 is a logical entity, which needs to include one or more PI documents, one or more assets, and ADC associated with each asset. In other words, a single package may be regarded as being configured with a single piece of PI, one or more MPUs, and ADC associated with each asset.

As described above, the package is processed on an MPU basis, and an asset is a set of one or more MPUs that share the same asset ID. The asset includes encoded media data, such as audio, video, or a web page, and the media data may be timed data or non-timed data.

A PI document specifies spatial and temporal relationships between assets for consumption. In an embodiment of the disclosure, a combination of HTML5 and a composition information (CI) document is used as a PI document, or a media presentation description (MPD) may be used as a PI document. A delivery sequence of an asset in a package may be determined using the PI document, and the PI document needs to be delivered in one or more signaling messages or as a complete document. For broadcasting, a service provider may determine the PI document to be a carousel and determine the frequency of performing carouseling.

The ADC needs to provide quality of service (QoS) required for asset delivery. Several assets may be associated with one ADC, but a single asset may not be associated with multiple ADCs. This information may be used to configure an MMTP payload header and an MMTP packet header field for an entity responsible for package packetization to efficiently deliver an asset. The ADC may provide information regarding transmission of the corresponding asset.

An asset is a logical group of MPUs that share the same asset ID to deliver media data encoded as any multimedia data used to compose a multimedia presentation.

Encoded media data of an asset may be either timed data or non-timed data. The timed data is encoded media data having a unique timeline, and may require synchronized decoding and presentation of the data unit at a specified time. The non-timed data is data of a type that has no unique timeline for decoding and presentation of media contents.

There is no need to have relationships in decoding time and presentation time between items of the same non-timed data. For example, decoding time and presentation time for each item of the non-timed data may be determined based on a user interaction or presentation information.

In an asset, each of MPUs includes non-overlapping fragments of the asset. In other words, two MPUs of the same asset that delivers timed data need to have non-overlapping presentation time. In other words, two different consecutive MPUs do not include the same media sample.

A media sample refers to media data associated with a timestamp. For example, a video sample includes data for one frame of the video.

Any type of data referenced by the PI is an asset. A media data type regarded as an individual asset includes e.g., audio, video, or a web page.

An MPU corresponds to a media data unit that may be independently consumed in a presentation engine of the MMT receiving entity. In other words, an MPU is a common container for independently decodable timed or non-timed data. The MPU is a data unit that is not bound by media codecs, and includes one or more media samples.

A single MPU may be separated into one or more MPU fragments. A media fragment unit (MFU) is an example of an MPU fragment. For packetization of an MPU, the MPU may be divided into data units, each of which is smaller than an AU, and the data unit may be a movie fragment.

An MPU fragment and the movie fragment have something in common that they are fragments of the MPU, and may often be used to refer to the same thing. However, in some cases, the movie fragment is not restricted to including one or more MPUs.

To manage delivery and consumption of media data with MMTP packets that contain the media data, even the MMT signaling message may be packetized into MMTP packets for transmission.

Figure 5:
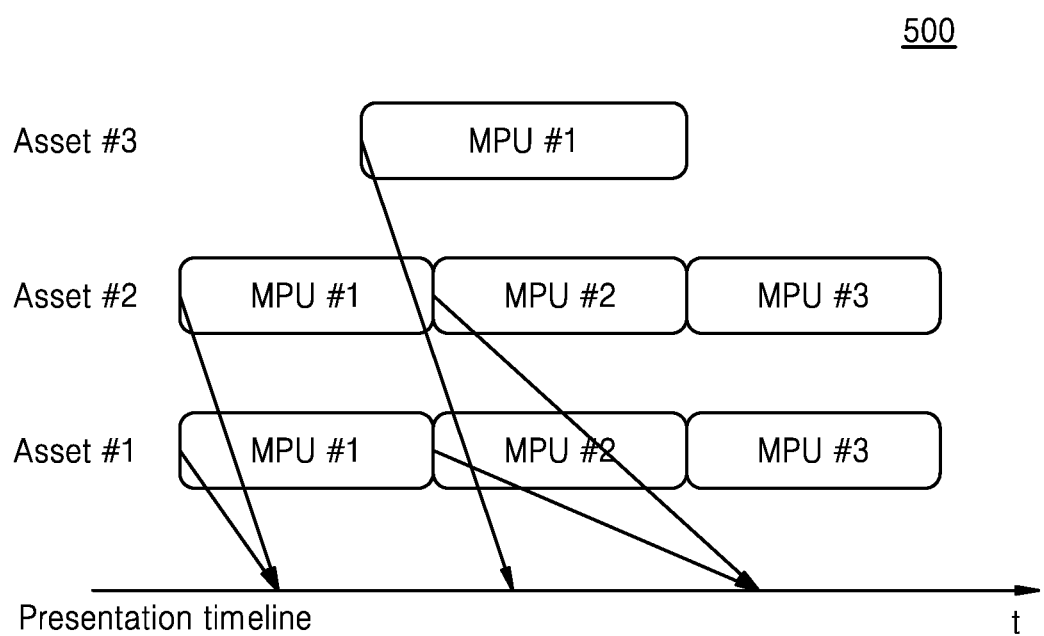
FIG. 5 illustrates a method of mapping media processing units (MPUs) to a presentation timeline according to an embodiment of the disclosure.

FIG. 5 illustrates a method of mapping MPUs to a presentation timeline according to an embodiment of the disclosure.

To transmit a package in an MMT system, MPUs included in the package are packetized in packets, which are suitable units for transmission depending on network properties. In the MMT system in particular, media data may be transmitted over a plurality of various kinds of networks including an IP network that utilizes the MMT protocol.

An MPU may include an MMT hint track that indicates boundaries of MFUs for media-aware packetization. Consumption of an MPU includes media processing (e.g., encoding and decoding) and presentation. Syntax and semantics of the MPU do not depend on a type of media data carried in the MPU.

For an asset with asset_id X that depends on an asset with asset_id Y, the m-th MPU of the asset with asset_id X and the n-th MPU of the asset with asset_id Y need to be non-overlapping when m is not equal to n. In other words, no sample in the m-th MPU of the asset with asset_id X is inside a time interval defined by sample boundaries of the n-th MPU of the asset with asset_id Y.

Furthermore, when the "sidx" box is present, media intervals defined by the "sidx" box need not to be non-overlapping. In other words, no media sample in the k-th media interval (defined by the "sidx" box) in an MPU is inside a time interval defined by sample boundaries of the j-th media time interval (defined by the "sidx" box) for the j-th media interval.

When there is no "sidx" box, concatenation of the j-th MPU of the asset with asset_id Y with the j-th MPU of the asset with asset_id X without its MPU metadata results in a valid MPU.

When an "sidx" box is present, concatenation of the k-th media interval (defined by the "sidx" box) of the j-th MPU of the asset with asset_id Y with the k-th media interval (defined by the "sidx" box) of the j-th MPU of the asset with asset_id X following the metadata of the MPU with asset_id Y results in a valid MPU.

A single MPU needs to include an integer number of AUs or non-timed data. In other words, for timed data, a single AU needs not to be fragmented into a plurality of MPUs. For non-timed data, a single MPU includes one or more non-timed data items to be consumed by a presentation engine.

An MPU may be identified with an asset ID (asset_id) and an MPU sequence number. The asset ID is an ID of an asset including data contained in the MPU, and the MPU sequence number indicates a sequence of the MPU in the asset including the MPU. The first MPU in the asset may have the MPU sequence number of '0', but there are no limitations on the MPU sequence number as long as the MPU sequence number is determined to match the MPU sequence in the asset.

For example, two different MPUs included in an asset have the same asset identifier while having different MPU sequence numbers. Consecutive MPUs may have consecutive MPU sequence numbers.

An MPU including timed media needs to have at least one stream access point (SAP). The first AU processed by an MTT entity needs to be an SAP (of SAP type 1, 2, 3). For timed media, the first AU in an MPU payload is always decoded first. For an MPU including data formatted according to other standards, an MPU payload starts with information required to process such a format. For example, when an MPU includes video data, the MPU payload includes one or more GoPs and decoder configuration information required to process the GoPs.

For timed media data, presentation duration, decoding order, and a presentation sequence of each AU are signaled as a portion of fragmented metadata. An MPU does not have its initial presentation time. Presentation time of the first AU in the MPU is described by a PI document. The PI document specifies initial presentation time of each MPU.

FIG. 5 illustrates presentation timing of MPUs of different assets provided in a PI document according to an embodiment of the disclosure.

Referring to FIG. 5, the PI document 500 specifies that the MMT receiving entity present MPU #1 of asset #1 and of asset #2, simultaneously. Subsequently, presentation of MPU #1 of asset #3 is scheduled, and finally, MPU #2 of asset #1 and of asset #2 are synchronized and presented.

The specified presentation time for an MPU defines presentation time of the first AU in the presentation order of the MPU. When there is an "elst" box, an indicated offset is applied to composition time of the first sample in presentation order of the MPU in addition to the presentation time provided by the PI.

Presentation time of every MPU needs to be provided as part of PI.

Figure 6:
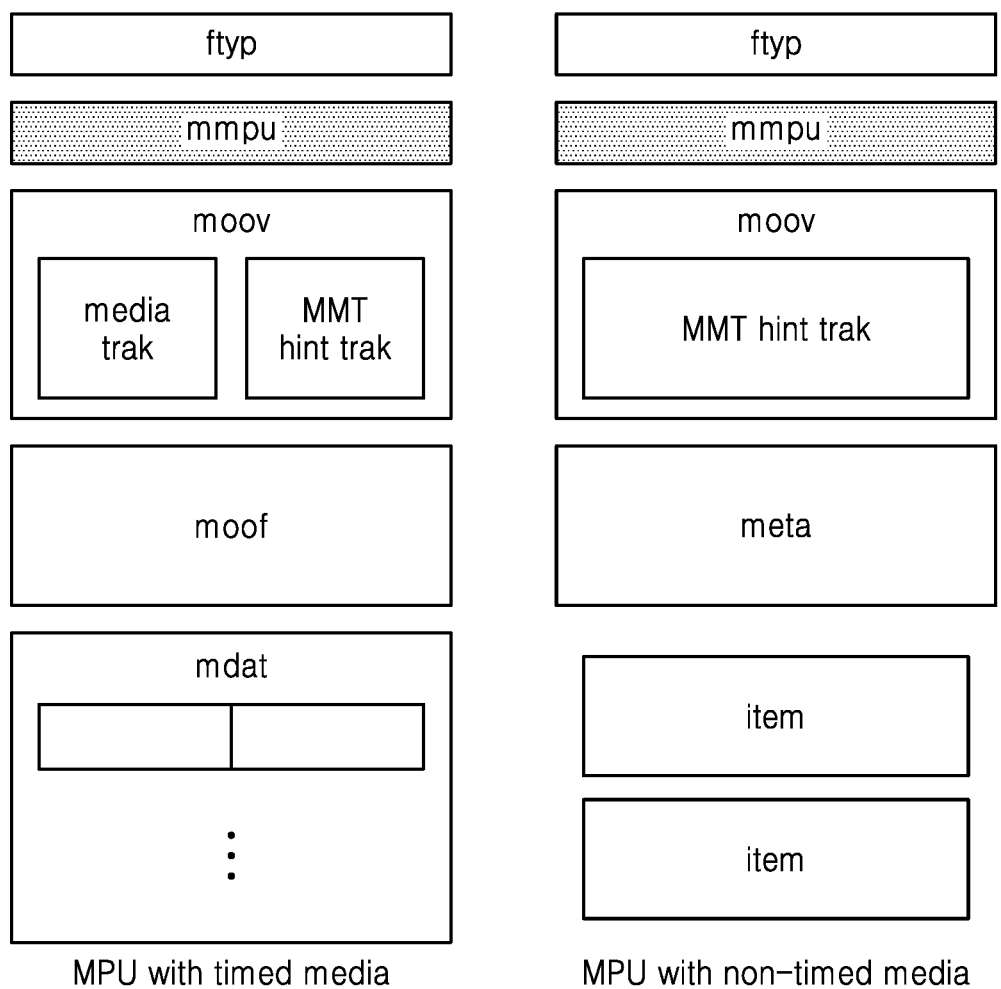
FIG. 6 is a block diagram of MPU encapsulation according to an embodiment of the disclosure.

FIG. 6 is a block diagram of MPU encapsulation according to an embodiment of the disclosure.

Referring to FIG. 6, two examples of MMT encapsulation are shown. (A) shows encapsulation of an MPU with timed media data, and (B) shows encapsulation of an MPU with non-timed media data. For packetized delivery of an MPU, an MMT hint track provides information for converting an encapsulated MPU to MMTP payloads and MMTP packets.

An MPU needs to be a conformant ISOBMFF file generated according to an MMT standard. An MPU sequence number and an asset ID are provided in an "mmpu" box to uniquely identify the MPU encapsulated in the file. Furthermore, in a case of timed media, an "sidx" box may be present to indicate movie fragments including the MPU. A "moov" box needs to include all codec reconstruction information for decoding and presentation of the media data.

The timed media data is stored as a track of an ISOBMFF, and a single media track is allowed. Non-timed media data is stored in an ISOBMFF as part of metadata.

A brand "mpuf (i.e., MPU file)" identifies a file that conforms to MPU encapsulation rules, and requires the support of an "isom" brand.

An MPU file is comprised of a set of metadata boxes that may include an MPU by itself. The MPU file includes "ftyp" and "moov" boxes, needs to include an "mmpu" box, and may optionally include an "sidx" box, all of which are part of MPU metadata. Other boxes are allowed, but will be ignored when the parser does not recognize them.

The "moov" box needs to include at most one media track, and may include an MMT hint track for MFUs. To ensure small overhead, the track in the "moov" box needs not to include any sample. In other words, entrypoint in "stts", "stsc" and "stco" boxes needs to be set to '0'. To indicate that a movie fragment structure is used, an "mvex" box needs to be included in the "moov" box for storing an MPU with timed media data. The "mvex" box sets default values for tracks and samples of the following movie fragments.

The "mmpu" box needs to occur at the file level, and the following rules including orders of boxes are applied:

a) when the "mmpu" box is present, it needs to be placed right after the "ftyp" box.

b) for timed media data, zero or more "sidx" boxes may be present in the file, and when the "sidx" box is present, it needs to indicate a movie fragment that builds the current MPU.

In addition to the box orders, the following constraints are applied to the "mpuf" brand:

a) the maximum number of independent (e.g., empty "tref" box) media tracks in the file is 1. Furthermore, tracks with non-empty "tref" box, e.g., hint tracks or a scalable video coding (SVC)/scalable high efficiency video coding (SHVC) enhancement layer tracks, may be used.

b) for timed media data, the file needs to include at least one movie fragment.

c) for non-timed media data, a "meta" box needs to be present at the file level and includes non-timed media items of the MPU.

d) when an edit list box ("elst" box) is present, the "elst" box provides an initial offset.

e) runs of sample data are placed in an "mdat" box and executed in decoding order, without any data between the runs.

f) sample auxiliary data described in "saio" and "saiz" needs to be located at the beginning of the "mdat" box before another sample data.

g) hint data needs to be placed in the "mdat" after sample data (or in another "mdat" after sample data) so as not to change sample offsets before or after transmission.

A "ftdt" box needs to be present in a "traf" box of each movie fragment to provide decoding time of the first sample of the movie fragment in decoding order. When there is an "elst" box, the indicated offset is applied to composition time of the first sample in presentation order of the MPU in addition to the presentation time provided by PI.

The timed media data is stored as a track of the ISOBMFF, and indexed by the "moov" and "moof" boxes in a fully backward-compatible manner. An MMT hint track guides the MMT transmitting entity in converting a file encapsulation MPU into a packetized media stream and deliver it using a transport protocol, such as the MMP protocol.

The non-timed media data is stored as a metadata item described in a "meta" box, and the "meta" box appears at the file level. As each file of the non-timed media data is stored as a separate floating item of the MPU, it needs not to be included in any box and appears after any boxes of the MPU. An entry point to the non-timed media needs to be marked as a primary item of the "meta" box.

An MPU box (mmpu) is defined as in Table 1.

TABLE 1

| Boxtype: | "mmpu" |
|---|---|
| Container: | File |
| Mandatory: | Yes |
| Quantity: | One or more |

The MPU box includes its ID of an asset to which the current MPU belongs, and other information of the current MPU. The asset ID is used to uniquely identify an asset globally. The MPU information includes a sequence number of the MPU in the corresponding asset.

When ADC is to be stored with the MPU, it needs to be stored in a "meta" box at the file level, and whether the ADC is present or not is indicated through an "is_adc_present" flag and an MME type of an item that stores the ADC.

Syntax of the MPU box is as in Table 2.

TABLE 2

```
aligned (8) class MPUBox
    extends FullBox ('mmpu', version, 0) {
    unsigned int (1) is_complete;
    unsigned int (1) is_adc_present;
    unsigned int (6) reserved;
    unsigned int (32) mpu_sequence_number;
    AssetIdentifier ( ) ;
aligned (8) class AssetIdentifier {
    unsigned int (32) asset_id_scheme;
    unsigned int (32) asset_id_length;
    unsigned int (8) asset_id_value [asset_id_length] ;
``` is_complete indicates whether all media samples and MFUs are present in the MPU (e.g., when it is being generated from live content).

mpu_sequence_number includes a sequence number of the current MPU. For the first MPU of an asset, the sequence number needs to be '0', and is incremented by 1 for each following MPU. The sequence number is unique in the asset.

asset_id_scheme identifies a scheme of an asset ID used in asset_id_value.

Valid schemes to identify the asset ID scheme are listed in Table 3.

TABLE 3

| Value | Description |
|---|---|
| 0x00000000 | UUID (universally unique identifier) |
| 0x00000001 | URI (uniform resource identifier) | asset_id_length is the length of asset_id_value.

asset_id_value includes an ID for the asset. A format of the value in this field is determined depending on the value of asset_id_scheme field.

is_adc_present indicates whether the ADC is present as an XML box in a "meta" box. The MIME type of the ADC file needs to be indicated in an item information box "iinf".

Figure 7:
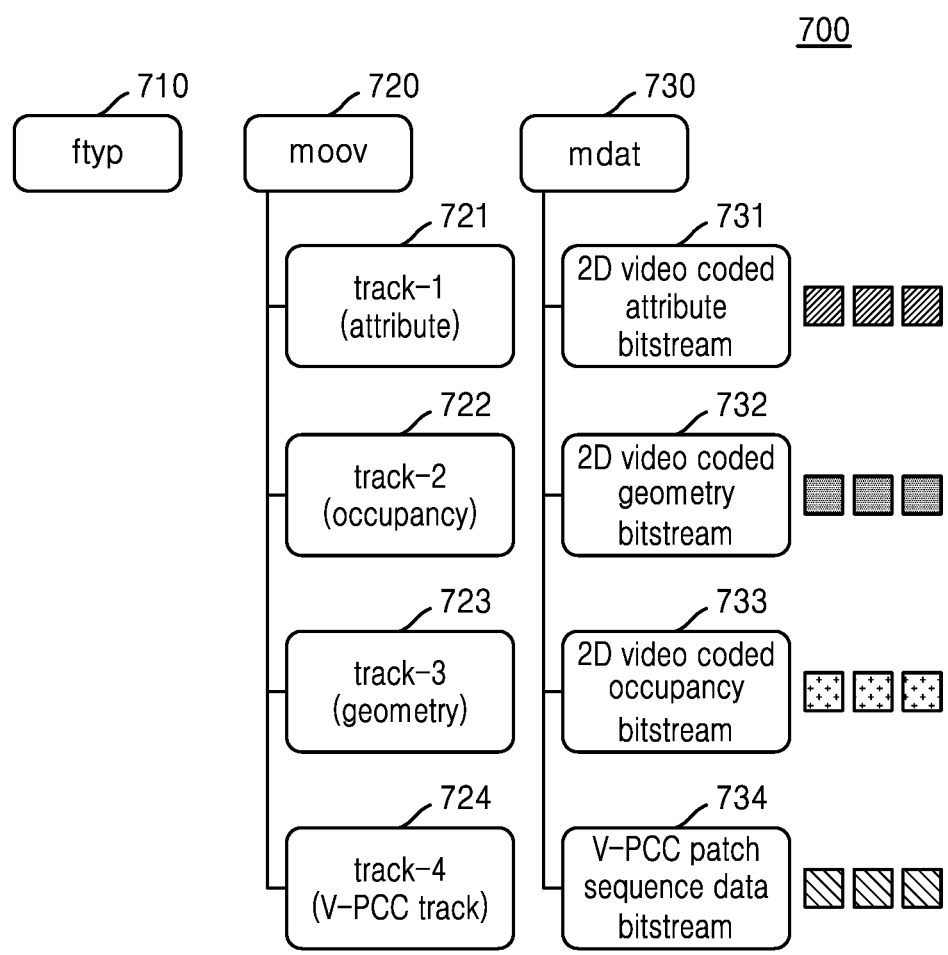
FIG. 7 illustrates a structure of a multi-track video-based point cloud contents (VPCC) file according to an embodiment of the disclosure.

FIG. 7 illustrates a multi-track VPCC file structure according to an embodiment of the disclosure.

The most universal technology to express volume-based 6 degrees of freedom (6DOF) content, a point cloud, expresses multiple points in 3D space as a point cloud.

A point in point cloud data may commonly include dept information and texture information. The depth information may be expressed in coordinates that represent a 3D position of the point in the space, such as (x, y, z). The texture information may be information representing color texture of the point, which is expressed e.g., in (r, g, b). Depending on image capture methods and use cases, information about other attributes that represent the point may be included in the point cloud data.

For a point cloud data compression technology, there is a video-based point cloud compression (VPCC) being developed in MPEG, which uses a 2D video codec to compress 3D point cloud data.

A method of encapsulating compressed point cloud data in a single file (locally or over a network) is performed by an MPEG system group, and more specifically, by storing the VPCC in an ISOBMFF file.

In an embodiment of the disclosure, a transmitting apparatus may compress a 3D video content to 2D video data, and encapsulate the compressed data in a certain media file format, in order to transmit the 3D video content. In this case, in an embodiment of the disclosure, the compressed point cloud may be encapsulated in the ISOBMFF file for transmission.

A VPCC stream is comprised of VPCC components including 2D video-compressed stream for geometry, texture (or attributes) and an occupancy map. A geometry image may represent position information of points in a point cloud, and a texture image may represent color information of the points. An occupancy map image may represent information about pixels having information regarding the point cloud among the pixels in the geometry image and the texture image.

The VPCC bitstream is a collection of video streams (for geometry, texture and occupancy maps) that may be independently decodable in associated time and static metadata. An ISOBMFF provides a proven structure to signalize and encapsulate the collection of the streams.

Referring to FIG. 7, a VPCC ISOBMFF file structure 700 in accordance with an embodiment of the disclosure may include an ftyp box 710, a moov box 720 including tracks for various VPCC components related to point cloud contents, and a media data (mdat) box 730 including media data. Each data type of VPCC is encapsulated as a media track, and the VPCC track includes information about a main track as an entry point to the media track and for presentation time referencing.

In an embodiment of the disclosure, an MMT transmitting or receiving entity may carry each of a plurality of VPCC components in a plurality of tracks in carrying the VPCC contents in the ISOBMFF. In mapping compressed VPCC component streams to individual tracks, a logical track may be included in the moov box 720, and actual compressed data may be included in the mdat box 730 in the form of samples.

The ftyp box (file type box) 710 may provide information about a file type of the corresponding media file or about compatibility.

The moov box (movie box) 720 may be a box including metadata for media data in the media file. The moov box 720 may serve as a container for all the metadata.

The moov box 720 may include a G track (track-3) 723 including metadata for geometry, an A track (track-1) 721 including metadata for an attribute (texture), an O track (track-2) 722 including metadata for occupancy (an occupancy map), and a V track (track-4) 724 including non-video-coded data and track reference information for VPCC, among components related to the point cloud contents.

The mdat (media data) box 730 may be a box that contains actual media data of the media file. The media data may include audio samples and/or video samples, and the mdat box 730 may serve as a container to contain these media samples.

The mdat box 730 may include a geometry bitstream 732 including media data for geometry, an attribute bitstream 731 including media data for an attribute (texture), an occupancy bitstream 733 including media data for occupancy (an occupancy map), and a patch sequence data bitstream 734 including information about VPCC, among components related to the point cloud contents. In this case, the bitstreams 732, 731, and 733 related to G, A, and O tracks 722, 721, and 723 may be encoded using video codecs, and the bitstream 734 related to the V track 724 may be encoded in different methods.

Referring to FIG. 7, VPCC units of VPCC elementary streams are mapped to individual tracks in a container file based on their respective types. In a multi-track ISOBMFF VPCC container, there are two types of tracks: the VPCC track 724 and the VPCC component track 721, 722, and 723.

The VPCC track is a track carrying volumetric visual information in the VPCC bitstream, which includes a path information sub-bitstream and a sequence parameter set.

VPCC component tracks are restricted video scheme tracks that carry 2D video encoded data for the occupancy map, geometry, and attribute (or texture) sub-bitstreams of the VPCC bitstream. In addition, the VPCC component tracks need to satisfy the following conditions:

a) in a sample entry, a new box that documents a role of a video stream included in this track is inserted in the VPCC system, b) a track reference is introduced from the VPCC track 724 to the VPCC component track 721, 722, and 723, to establish a membership of the VPCC component track 721, 722, and 723 in a specific point cloud represented by the V-PCC track 724, c) a track-header flag is set to 0 to indicate that this track does not contribute directly to the overall layup of the movie but contributes to the V-PCC system.

Tracks belonging to the same VPCC sequence are time-aligned. Samples that contribute to the same point cloud frame across the different video-encoded VPCC component tracks 721, 722, and 723 and the VPCC track 724 need to have the same presentation time. VPCC patch parameter sets used for the samples need to have a decoding time equal or prior to a composition time of the point cloud frame. In addition, all tracks belonging to the same VPCC sequence need to have the same implicit or explicit edit lists.

Synchronization between the elementary streams in the component tracks are handled by ISOBMFF track timing structures (stts, ctts, and cslg), or equivalent mechanisms in movie fragments. Sync samples in reference tracks are not required to be time-aligned (though a profile may require time-alignment). In the absence of time-alignment, random access may involve pre-rolling of various tracks at different sync start times to enable starting at a desired time.

Based on the layout of FIG. 7, a VPCC ISOBMFF container needs to include the following tracks:

A VPCC track including sequence parameter sets (in the sample entry) and samples carrying payloads of a sequence parameter set VPCC unit (unit type VPCC_SPS) and patch data group VPCC units (unit type VPCC_PDG). This track also includes track references to other tracks carrying payloads of video compressed V-PCC units (i.e., unit types VPCC_OVD, VPCC_GVD, and VPCC_AVD).

A restricted video scheme track where samples include AUs of a video-coded elementary stream for occupancy map data (i.e., payloads of V-PCC units of type VPCC_OVD).

One or more restricted video scheme tracks where samples include AUs of video-coded elementary streams for geometry data (i.e., payloads of V-PCC units of type VPCC_GVD).

Zero or more restricted video scheme tracks where samples include AUs of video-coded elementary streams for attribute data (i.e., payloads of V-PCC units of type VPCC_AVD).

Figure 8:
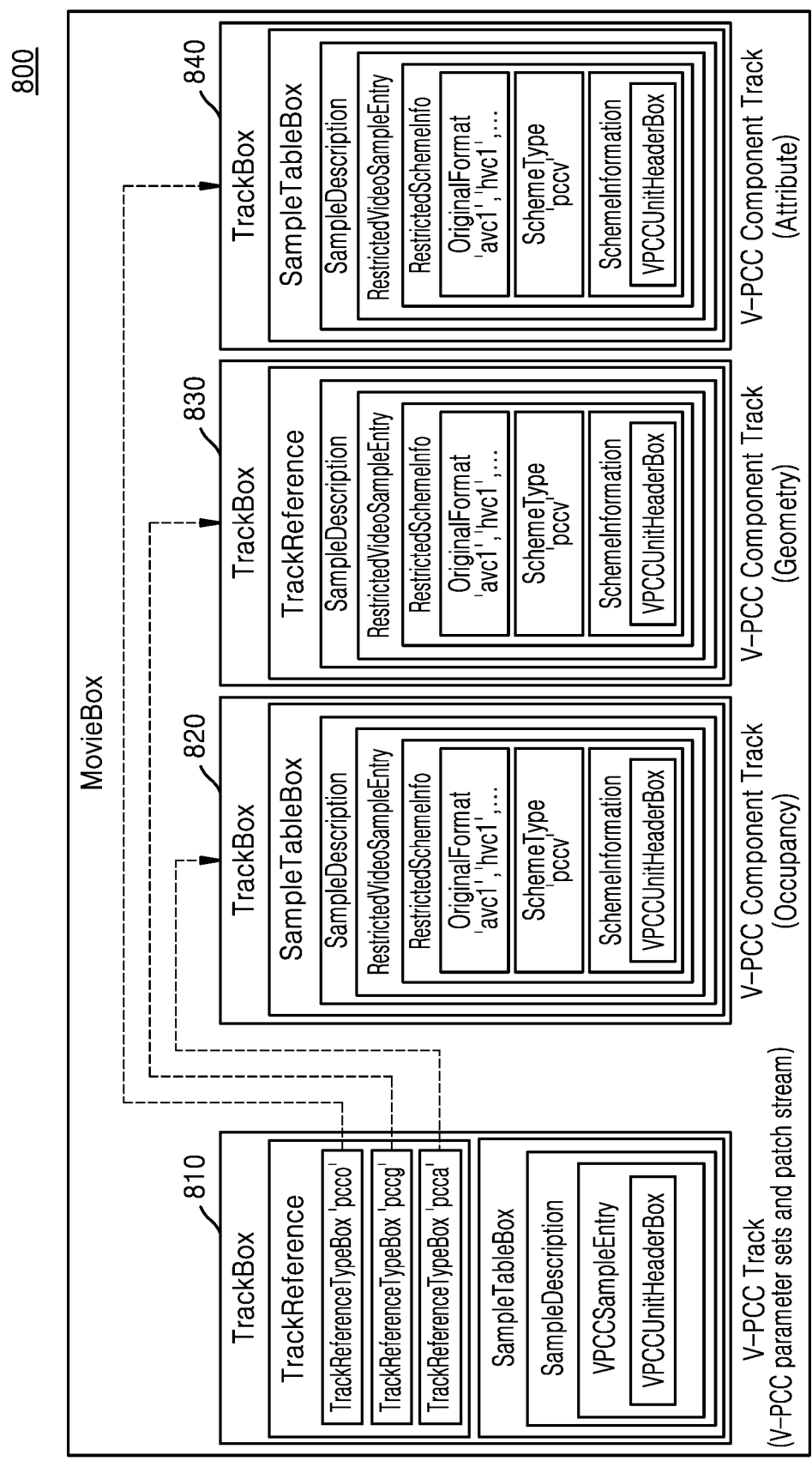
FIG. 8 illustrates a structure of an international organization for standardization (ISO) base media file format (ISOBMFF) VPCC container according to an embodiment of the disclosure.

FIG. 8 illustrates a structure of an ISOBMFF VPCC container according to an embodiment of the disclosure.

Referring to FIG. 8, a VPCC ISOBMFF file for VPCC content commonly has the following structure:

- a file level box used as an entry point to the content, which includes metadata providing high-level information about multiple tracks that build the content of the file. The file level box includes at least one VPCC track including a point cloud media sample.
- as an "elementary" track for VPCC contents, the VPCC track includes various types of track reference boxes by referring to various video encoding component tracks that build the VPCC contents.
- when there is no multiplexing or re-encapsulation of the VPCC data component (and file metadata), the ISOBMFF needs to have at least the following components:
  - four media tracks related to visual media
  - three video tracks (geometry, texture, occupancy)
  - a VPCC track including non-video coded data and a track reference
  - a file level box providing a list of tracks that build the VPCC content. This box includes VPCC-related information, such as mapping an attribute type and layer to associated tracks.

The ISOBMFF VPCC container may include a MetaBox (not shown) and a MovieBox 800.

The MetaBox may include a GroupListBox, which may include an EntityToGroupBox. The EntityToGroupBox refers to an entry point to a PCC file that provides an initial high-level information of the VPCC content.

Referring to FIG. 8, the MovieBox 800 may include a VPCC track 810, and VPCC component tracks: a geometry track 830, an attribute track 840, and an occupancy track 820. The VPCC track 810 refers to an entry point to the VPCC content including a sequence and a frame parameter set defined in VPCC in addition to other compressed metadata. The geometry track 830, the attribute track 840, and the occupancy track 820 refer to video tracks for video encoded components of VPCC streams.

The VPCC content may include a geometry data elementary stream, a texture (or attribute) data elementary stream, an occupancy map data elementary stream, and a metadata elementary stream. The geometry data elementary stream, the texture data elementary stream, and the occupancy map data elementary stream may each be compliant with an independent 2D video codec, and may be stored as compatible 2D video media tracks. The metadata elementary stream needs to provide an entrance point to a PCC file, and also needs to provide references to the geometry data elementary stream, the texture data elementary stream, and the occupancy map data elementary stream.

Figure 9:
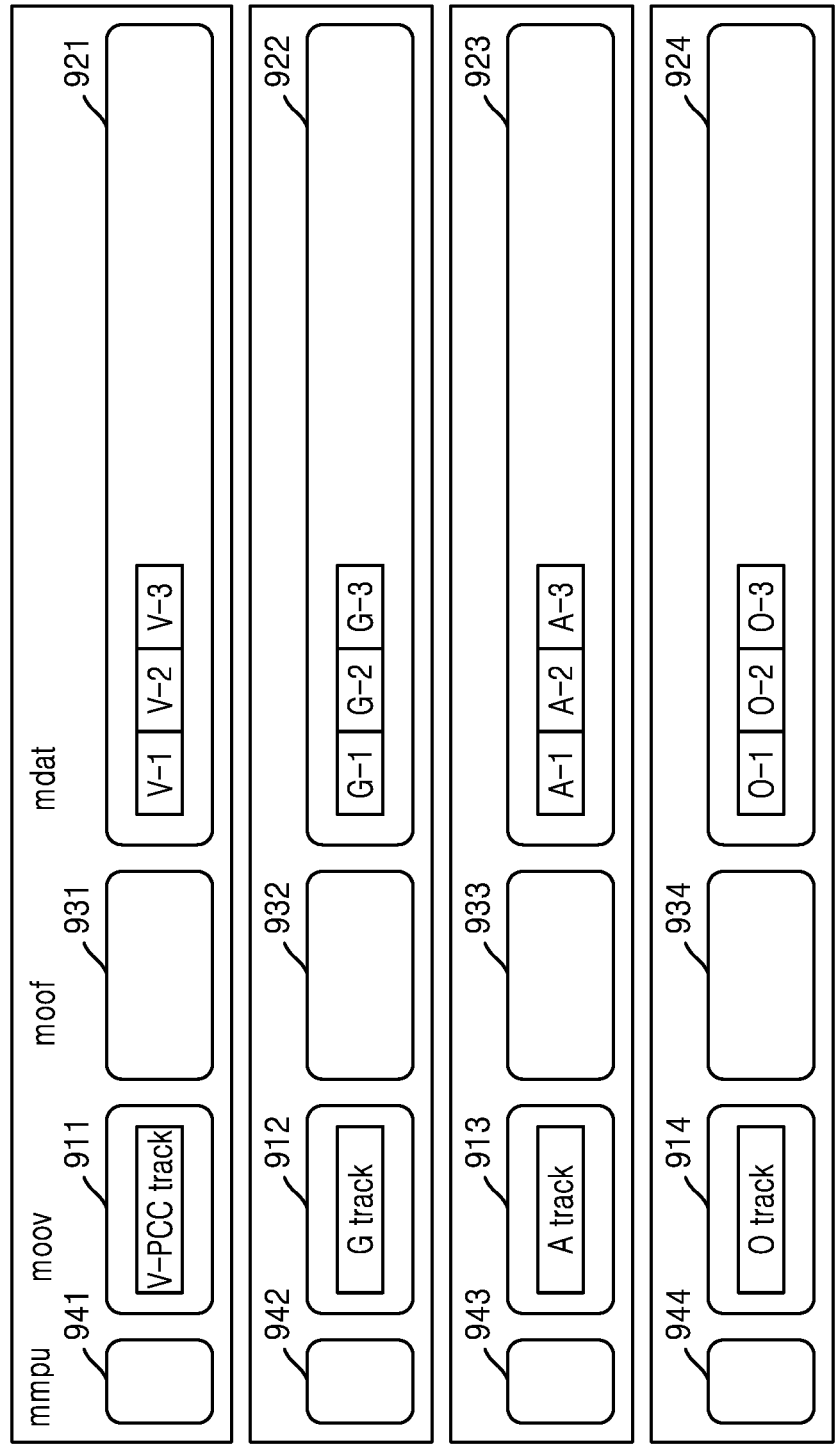
FIG. 9 illustrates a structure of an ISOBMFF file in a case of MPU encapsulation of a multi-track ISOBMFF file for MMT transmission according to an embodiment of the disclosure.

FIG. 9 illustrates a structure of an ISOBMFF file in a case of MPU encapsulation of a multi-track ISOBMFF file for MMT transmission according to an embodiment of the disclosure.

Referring to FIG. 9, a multi-track ISOBMFF file may be encapsulated into multiple assets, in which case a plurality of assets may be configured for each data track.

As described above in connection with FIG. 6, an MPU includes a conformant ISOBMFF file generated according to the MMT standard, and an MPU file includes a set of metadata boxes that may include an MPU on its own. The MPU file may include an "ftyp" box (not shown), an "moov" box 911, 912, 913, and 914, an "moof" box 931, 932, 933, and 934, an "mdat" box 921, 922, 923, and 924, and an "mmpu" box 941, 942, 943, and 944. The "mmpu" box includes information for uniquely identifying an encapsulated MPU in the file, such as a sequence number of the MPU and an asset ID.

As described above, an ISOBMFF file for MMT transmission in multi-track VPCC includes a plurality of independent asset streams, and in MMT, the following functions need to be additionally defined:

First, assets that constitute each data track need to be grouped in a multi-component single media type to identify minimum requirements at an MMT packet level.

Second, data types need to be exposed for MMT to select and deliver an asset without unnecessary file parsing.

Third, as asset switching timing control or pipeline issues may occur due to multi-asset media dependency, pipeline issues need to be avoided by controlling asset switching timing.

Fourth, a client, i.e., an MMT receiving entity, needs to be allowed to select an asset for a media service.

However, there are no such functions implemented in the existing MMT, so a signaling message for addressing the aforementioned issues and implementing new functions need to be additionally defined.

Carriage of point cloud data defines storage and delivery of a VPCC file. A VPCC-encoded content may be delivered using MMT over a network. In this regard, an MMT signaling message required for VPCC data encapsulation for MMT streaming and VPCC data delivery through MMT needs to be defined.

The MMT defines an application-specific signaling message to deliver application-specific information.

For VPCC-encoded data streaming using the MMT, a VPCC-specific signaling message is defined. The VPCC-specific signaling message includes an application identifier where an urn value is "urn:mpeg:mmt:app:vpcc:2019".

Table 4 represents VPCC-specific application message types.

TABLE 4

| Application Message Type | Application Message Name |
|---|---|
| 0x01 | VPCCAssetGroupMessage |
| 0x02 | VPCCCSelectionFeedback |
| 0x03-0xFF | Reserved |

VPCCAssetGroupMessage is a message transmitted by an MMT transmitting entity, and the MMT transmitting entity transmits VPCCAssetGroupMessage to inform the client of a set of assets, which are available at a server, and an asset list streamed to a receiving entity.

VPCCCSelectionMessage is a message transmitted by the client, and the client transmits VPCCCSelectionMessage to request a set of assets to be streamed by the transmitting entity to the receiving entity.

VPCCAssetGroupMessage is a mandatory signaling message when transmitting VPCC encoded content through MMT, providing the client with a list of VPCC data type assets available at the server and informing the client about which of the assets is currently being streamed to the receiving entity.

The client may use VPCCCSelectionFeedback to request a subset of VPCC data type assets from the asset list provided.

Table 5 represents syntax of VPCCAssetGroupMessage.

TABLE 5

| Syntax | Values | No. of bits | Mnemonic |
|---|---|---|---|
| Application ( ){ | | | |
|     message_id | | 16 | |
|     version | | 8 | |
|     length | | 16 | |
| application_identifier( ) | | | uimsbf |
|     if (application_identifier == "urn:mpeg:mmt:app:vpcc:2019") | | | |
|     { | | | |
|       app_message_type | | 8 | |
|       if (app_message_type == 0x01) { | | | |
|         num_vpcc_asset_groups | N1 | 8 | |
|         for (i=0; i<N1; i++) { | | | |
|           asset_group_id | | 16 | |
|           num_assets | N2 | 16 | |
|           start_time | | 16 | |
|           for (j=0; j<N2; j++) { | | | |
|             data_type | | 8 | |
|             reserved | "1111" | 4 | |
|             is_pcm | | 1 | |
|             is_single_layer | | 1 | |
|             state_flag | | 1 | |
|             sending_time_flag | | 1 | |
|             if(sending_time_flag){ | | | |
|               sending_time | | 16 | |
|             } | | | |
|             asset_id | | 16 | |
|           } | | | |
|         } | | | |
|       } | | | |
|     } | | | |
| } | | | |

TABLE 6

| Application Message Type | Application Message Name |
|---|---|
| 0x01 | VPCCAssetGroupMessage |
| 0x02 | VPCCCSelectionFeedback |
| 0x03-0xFF | Reserved | is_pcm is a signal added for MMT transmission, which is a flag indicating whether the VPCC component information present in the asset stream is for a missing points patch. When set to "1", the VPCC component information is for a missing points patch, otherwise this flag is set to "0".

is_single_layer is a signal added for MMT transmission, which is a flag indicating whether the VPCC component information present in the asset stream carries one layer or all the layers of the VPCC content. When this flag is set to "1", it indicates that only a single layer is present, and when this flag is set to "0", it indicates that a layer for the component is present.

state_flag is a flag indicating a delivery state of an asset. When set to "1", this indicates that the transmitting entity is transmitting the asset to the receiving entity. When set to "0", this indicates that the transmitting entity is not transmitting the asset to the receiving entity.

sending_time_flag is a flag indicating the presence of sending_time for the first MMTP packet including the first MPU of the asset stream, and its default value is "0".

sending_time indicates transmitting time for the first MMTP packet including the first MPU of the asset stream. Using this information, the client may prepare a new packet processing pipeline for a new asset stream.

asset_id provides an asset identifier of an asset.

As seen from the syntax of VPCCAssetGroupMessage, information about asset grouping may be signaled in such fields as num_vpcc_asset_groups, asset_group_id, and message_id indicates an identifier of a VPCC application message.

version indicates a version of the VPCC application message.

length indicates length of the VPCC application message in bytes, counting from the beginning of the next field to the last byte of the message. The value of this field needs not to be equal to '0'.

application_identifier indicates an application identifier as an urn that uniquely identifies an application to consume the content of this message.

app_message_type defines an application-specific message type provided in Table 5, and the length of this field is 8 bits.

num_vpcc_asset_groups indicates the number of VPCC asset groups. Each VPCC asset group includes component assets associated with a VPCC content.

num_assets indicates the number of assets included in the asset group associated with the VPCC content.

start_time indicates presentation time of the VPCC content from which states of the assets listed in this message are applicable.

data_type indicates a data type of point cloud data present in the asset stream.

Table 6 represents data types based on values of data type fields.

num_assets, and with the data_type field, a data type of each asset may be determined from the signaling message without file level parsing.

Furthermore, using start_time of an asset group, and state_flag, sending_time_flag, sending_time, and asset_id of each asset, multi-asset switching may be synchronized.

Figure 10:
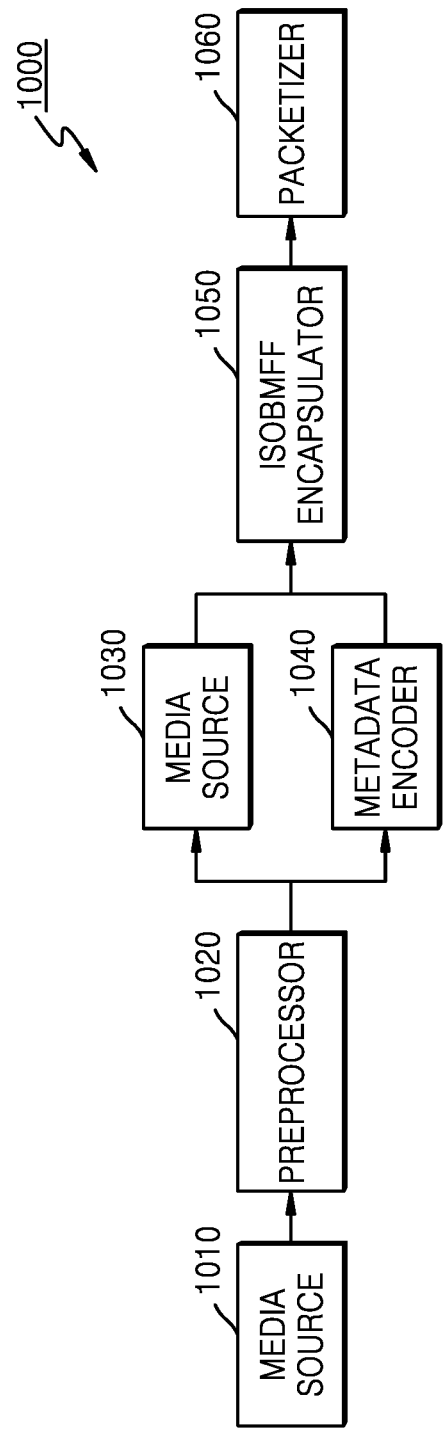
FIG. 10 illustrates an operation procedure of a transmitting entity according to an embodiment of the disclosure.

FIG. 10 illustrates an operation procedure of a transmitting apparatus according to an embodiment of the disclosure.

In an embodiment of the disclosure, a transmitting apparatus 1000 may be a server or an MMT transmitting entity.

Referring to FIG. 10, a media source 1010 of the transmitting apparatus 1000 may directly capture one or more 3D objects or obtain them stored in advance, and output the 3D object. The 3D object may be e.g., ply files including point cloud data. The 3D object may be 3D video contents including a plurality of point cloud frames.

A preprocessor 1020 of the transmitting apparatus 1000 may perform a preprocessing procedure for compressing the 3D object using a 2D video encoder. From the 3D object, the preprocessor 1020 may output a video frame to be used as an input to a video encoder 1030 and metadata required by a receiving entity to reconstruct the 3D object.

The preprocessor 1020 may generate at least one 2D image by projecting 3D image data included in the 3D object onto a 2D plane. In an embodiment of the disclosure, the preprocessor 1020 may perform projection that projects omni-directional image in 3D space onto a rectangular picture in a predefined format. The preprocessor 1020 may generate 2D video frames from the projected 2D image.

For example, the preprocessor 1020 may generate a patch by projecting a plurality of points included in a 3D point cloud onto the 2D plane. The plurality of points included in the 3D point cloud may be grouped based on at least one of normal vector direction, position, or color of the point. The preprocessor 1020 may generate a patch by projecting the grouped points onto the plane. The preprocessor 1020 may generate a geometry image, a texture image (or an attribute image), and an occupancy map image by sorting out patches with high similarity and gathering and packing the sorted patches. The geometry image may represent position information of points included in the point cloud, and a texture image may represent color information of the points. The occupancy map image may represent information about pixels having information regarding the point cloud among the pixels in the geometry image and the texture image.

The preprocessor 1020 may output video frames including the geometry image, the texture image, and the occupancy map image, and metadata required by a receiving apparatus to reconstruct the 3D object. For example, the preprocessor 1020 may output auxiliary information as metadata.

Subsequently, in an embodiment of the disclosure, the transmitting apparatus 1000 may compress the video frames and the metadata using the video encoder 1030 and the metadata encoder 1040. Depending on implementation methods, the transmitting apparatus 1000 may include two or more video encoders 1030 or may not include the metadata encoder 1040.

In an embodiment of the disclosure, an ISOBMFF encapsulator 1050 of the transmitting apparatus 1000 may encapsulate the video data and metadata compressed in the video encoder 1030 and the metadata encoder 1040 into a media file. For example, the ISOBMFF encapsulator 1050 may encapsulate the compressed video data and metadata into an ISOBMFF media file.

In an embodiment of the disclosure, a packetizer 1060 of the transmitting apparatus 1000 may packetize and transmit the encapsulated media file in packets. For example, the packetizer 1060 may transmit bitstreams including packets generated based on an MMT scheme.

In an embodiment of the disclosure, the transmitting apparatus 1000 may compress video frames using one or more video codecs to provide the same contents to receiving apparatuses with various capabilities. In this case, an ISOBMFF file may include only video data generated using one video codec, or include all the video data generated using the multiple video codecs.

In the latter case that the single ISOBMFF file includes all the video data generated using the multiple video codecs, for example, a receiving apparatus may select a video codec to selectively decode the video data. In another example, a processing entity located in a network between the transmitting apparatus and the receiving apparatus may modify the file to include only video data generated using one video codec according to a request from the receiving apparatus or pre-shared preference information, and transmit the modified file.

Figure 11:
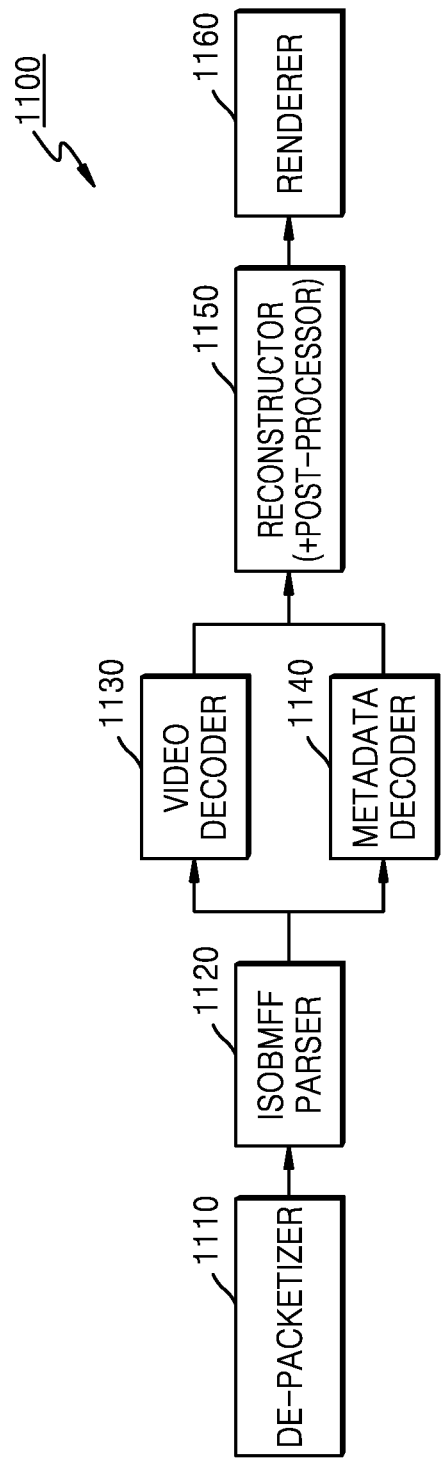
FIG. 11 illustrates an operation procedure of a receiving entity according to an embodiment of the disclosure.

FIG. 11 illustrates an operation procedure of a receiving apparatus according to an embodiment of the disclosure.

Referring to FIG. 11, a receiving apparatus 1100 may be a client or an MMT receiving entity.

A de-packetizer 1110 of the receiving apparatus 1100 in an embodiment of the disclosure may process a received packet to reconstruct a media file. Alternatively, the de-packetizer 1110 may process received packets in receiving order without waiting until all the packets that constitute the media file arrive. For example, the de-packetizer 1110 may reconstruct an ISOBMFF file by processing received packets.

An ISOBMFF parser 1120 of the receiving apparatus 1100 in an embodiment of the disclosure may process all or part of a received media file to extract encoded video data and metadata. The ISOBMFF parser 1120 may extract the encoded video data and metadata from a received ISOBMFF file.

In an embodiment of the disclosure, the receiving apparatus 1100 may decode the encoded video data and metadata using a video decoder 1130 and a metadata decoder 1140.

A reconstructor 1150 of the receiving apparatus 1100 in an embodiment of the disclosure may reconstruct a 3D object using the decoded video data and metadata.

In an embodiment of the disclosure, the receiving apparatus 1100 may further include a post-processor for enhancement of image quality.

For example, the video data may include a texture image, a geometry image, and an occupancy map image, and the metadata may include auxiliary information including patch information. In an embodiment of the disclosure, the reconstructor 1150 may reconstruct geometry of points using the geometry image, the occupancy map image, and the auxiliary information. The reconstructor 1150 may reconstruct a point cloud based on the reconstructed geometry and texture images.

A renderer 1160 of the receiving apparatus 1100 in an embodiment of the disclosure may display a 3D image on the screen by rendering the reconstructed 3D object.

Figure 12:
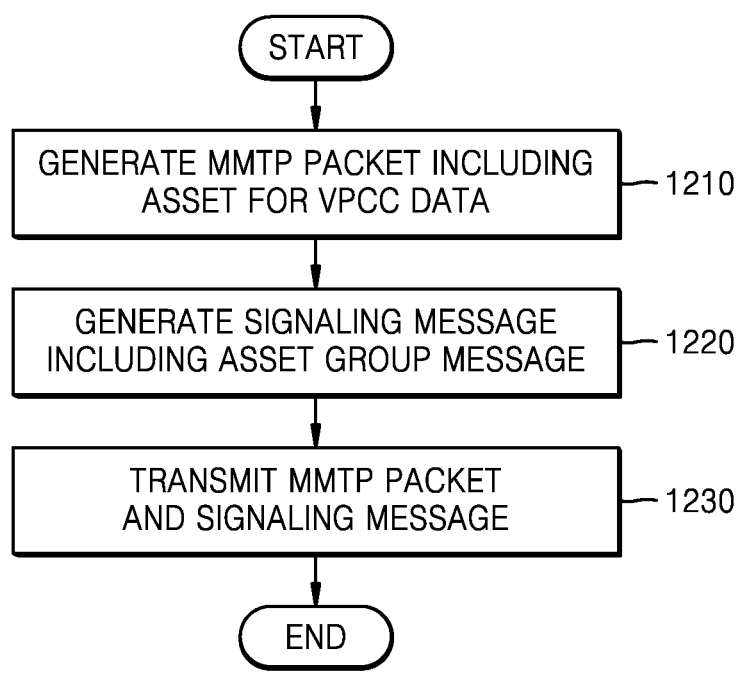
FIG. 12 is a flowchart of operations of a transmitting entity according to an embodiment of the disclosure.

FIG. 12 is a flowchart of operations of a transmitting apparatus according to an embodiment of the disclosure.

Referring to FIG. 12, a transmitting apparatus may be a server or an MMT transmitting entity.

In operation 1210, the transmitting apparatus may generate MMTP packets including an asset for VPCC data.

As described above, the VPCC data represents multiple points in 3D space in a point cloud, and may include a geometry image including information about 3D positions of the points, an attribute image including information about color or texture of the point, and an occupancy map image including information about pixels containing information about the point cloud among pixels in the geometry image and the attribute image.

Furthermore, in a multi-track ISOBMFF VPCC container, there are two types of track a VPCC track and a VPCC component track. In a case of MPU encapsulation for MMT transmission, each data track of the multi-track ISOBMFF file may include a plurality of independent asset streams. For example, a plurality of independent asset streams are present for one data type. An MMTP packet is an encapsulated MMT package, which corresponds to a transmission unit for MMT transmission.

In operation 1220, the transmitting apparatus may generate a signaling message including an asset group message.

The signaling message is a message exchanged between an MMT transmitting entity and an MMT receiving entity, which is used to deliver control information required to consume a package received at a receiving end and control information required to efficiently deliver MMTP packets in a transport network, or deliver transport function parameters required to obtain multimedia compression data from MMTP packets received at the receiving end.

Assets that constitute each data track need to be grouped in a multi-component single media type to identify minimum requirements at the MMT packet level, and the asset group message includes information about each asset group. In an embodiment of the disclosure, the asset group message is a message transmitted by the MMT transmitting entity, and the MMT transmitting entity may transmit VPCCAssetGroupMessage to inform the client of a set of assets, which are available at a server, and an asset list streamed to the receiving apparatus. Details of VPCCAssetGroupMessage were described above, and will not be repeated.

In 1230, the transmitting apparatus may transmit the generated MMTP packet and the signaling message to the receiving apparatus. The signaling message includes an asset group message.

Figure 13:
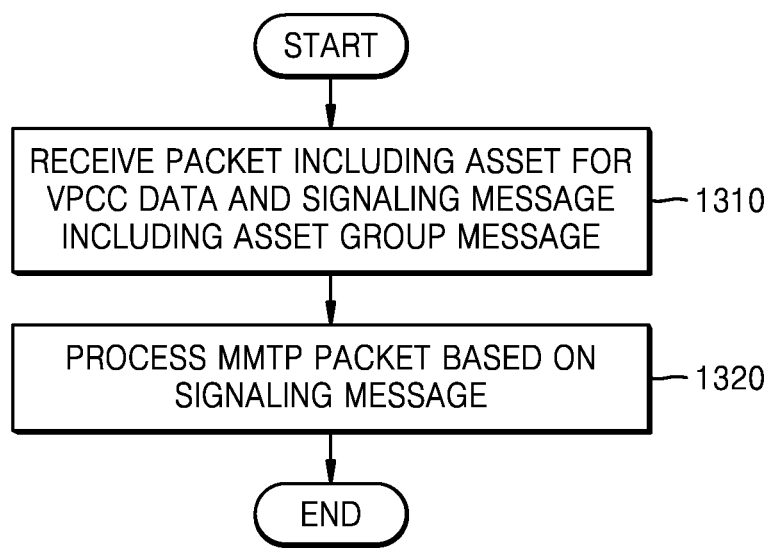
FIG. 13 is a flowchart of operations of a receiving entity according to an embodiment of the disclosure.

FIG. 13 is a flowchart of operations of a receiving apparatus according to an embodiment of the disclosure.

Referring to FIG. 13, a receiving apparatus may be a client or an MMT receiving entity.

In operation 1310, the receiving apparatus may receive MMTP packets including an asset for VPCC data and a signaling message including an asset group message from a transmitting apparatus.

The VPCC data represents multiple points in 3D space in a point cloud, and may include a geometry image including information about 3D positions of the points, an attribute image including information about color or texture of the point, and an occupancy map image including information about pixels containing information about the point cloud among pixels in the geometry image and the attribute image.

Furthermore, in a multi-track ISOBMFF VPCC container, there are two types of track a VPCC track and a VPCC component track. In a case of MPU encapsulation for MMT transmission, each data track of the multi-track ISOBMFF file may include a plurality of independent asset streams. For example, a plurality of independent asset streams may be present for one data type. An MMTP packet is an encapsulated MMT package, which corresponds to a transmission unit for MMT transmission.

Furthermore, assets that constitute each data track need to be grouped in a multi-component single media type to identify minimum requirements at the MMT packet level, and the asset group message includes information about each asset group. In an embodiment of the disclosure, the asset group message is a message transmitted by the MMT transmitting entity, and the MMT transmitting entity may transmit VPCCAssetGroupMessage to inform the client of a set of assets, which are available at a server, and an asset list streamed to the MMT receiving entity. Details of VPCCAssetGroupMessage were described above, and will not be repeated.

In operation 1320, the receiving apparatus may process the received MMTP packets based on the received signaling message.

In an embodiment of the disclosure, the receiving apparatus may determine based on the received signaling message whether switching of an asset group being received is planned, i.e., whether reception of an asset group being currently received is to be stopped and a new asset group is to be received.

When switching of an asset group is planned, the receiving apparatus may determine a processing pipeline to process the new asset group (or an MMTP packet including the new asset group), and renew the existing processing pipeline with the new processing pipeline. A method of renewing the asset (or packet) processing pipeline will be described below in detail.

In an embodiment of the disclosure, the receiving apparatus may request from the transmitting apparatus switching of an asset group which is being received. For example, when it is desired to change an attribute asset stream of an asset group being currently received to an asset stream having a different attribute (e.g., from blue to red), the receiving apparatus may transmit a signaling message including an asset selection message for the asset stream having the different attribute to the transmitting apparatus.

In an embodiment of the disclosure, the asset selection message is a message transmitted by the MMT receiving entity, and the receiving apparatus may transmit VPCCCSelectionMessage to request a set of assets to be streamed by the transmitting apparatus to the receiving apparatus. Details of VPCCCSelectionMessage were described above, and will not be repeated.

In an embodiment of the disclosure, upon reception of the signaling message including the asset selection message, the transmitting apparatus may perform asset group switching to transmit an asset group (or an MMTP packet including an asset group requested for transmission) based on the asset selection message. How to switch to an asset group (or an MMTP packet including an asset group requested for transmission) will be described later in detail.

Figure 14:
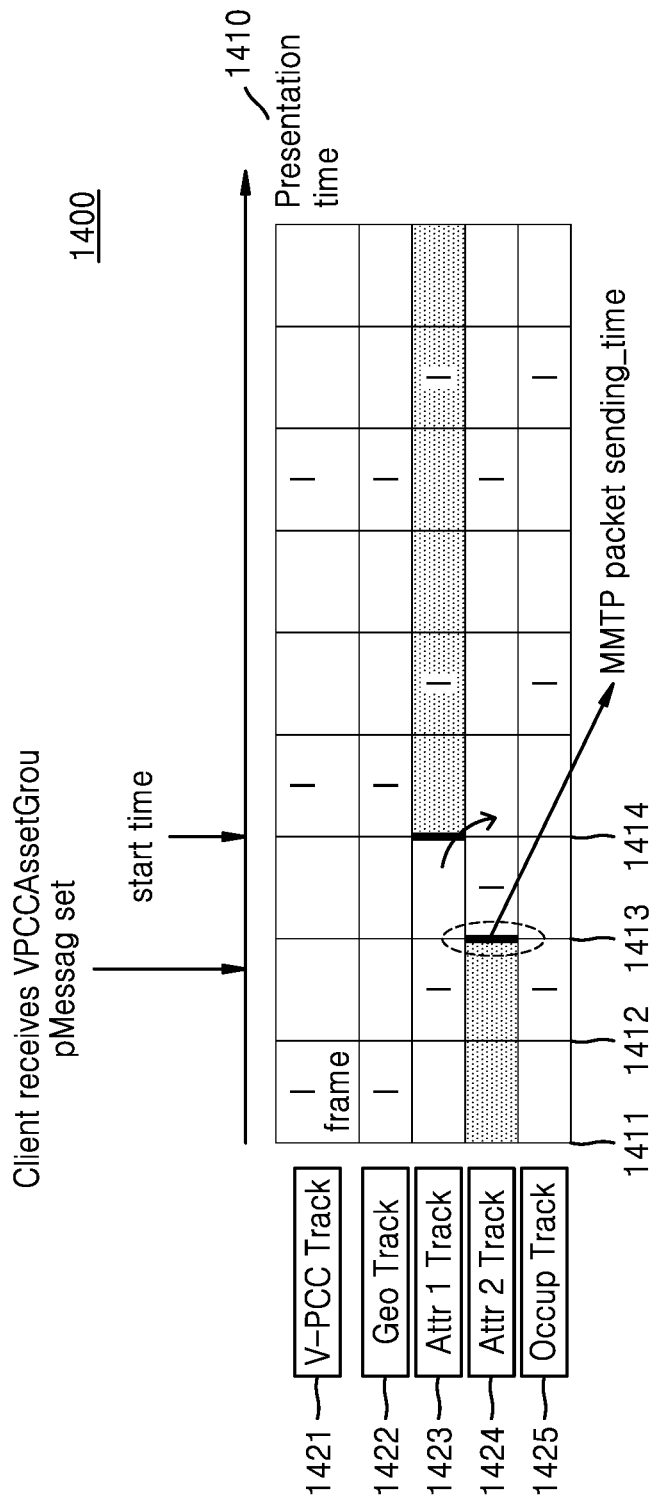
FIG. 14 illustrates a method of configuring a pipeline in presentation time when asset switching is required in a receiving entity according to an embodiment of the disclosure.

FIG. 14 illustrates a method of configuring a pipeline in presentation time when asset switching is required in a receiving apparatus according to an embodiment of the disclosure.

Presentation time 1400 for a multi-track VPCC content is based on VPCC track presentation time. start_time is required to compensate for a difference between a time at which VPCCAssetGroupMessage is received and an actual asset stream switching point.

sending_time indicates transmission time for the first MMTP packet including the first MPU of an asset stream, and the receiving apparatus (a client or an MMT receiving entity) may use this information to prepare a new packet processing pipeline for the new asset stream. When the new packet processing pipeline is prepared, the transmitting apparatus (a server or an MMT transmitting entity) transmits an updated MP table and an HRBM message to the receiving apparatus before the sending_time.

Referring to FIG. 14, VPCC data includes a VPCC track 1421, a geometry track 1422, an attribute 1 track 1423, an attribute 2 track 1424, and an occupancy map track 1425, and the receiving apparatus starts reception for the VPCC track 1421, the geometry track 1422, the attribute 1 track 1423, and the occupancy map track 1425. Presentation time 1410 is marked by 1411, 1412, 1413, 1414, and the like, in an MMTP packet reception flow. In another embodiment of the disclosure, reference time may be set based on absolute time, e.g., universal time coordonné (UTC) rather than the presentation time.

When the receiving apparatus receives an asset of the attribute 2 track 1424 while receiving an asset of the attribute 1 track 1423, asset group switching is required for an attribute track. The asset group switching may be server-driven or client-driven, and when client-driven asset group switching is started, it uses a VPCCCSelectionFeedback message.

When the receiving apparatus switches to receiving the attribute 2 track 1424 while receiving the attribute 1 track 1423, inconsistency in the GoP structure may occur. Intra frames (I frames) that constitute a GoP are a complete image, so they do not refer to other frames and may come at any places, while other frames (e.g., P frames and B frames) refer to previous I frames for forward or bidirectional prediction and require the I frame at the time of decoding. Accordingly, in order for the receiving apparatus to obtain a previous I frame to decode received image data, asset switching needs to be synchronized and a pipeline for packet processing needs to be generated.

When the receiving apparatus receives VPCCAsset-GroupMessage between presentation times 1412 and 1413 and start_time defined in the VPCCAssetGroupMessage corresponds to 1414, it needs to receive a new asset group, i.e., an asset group for the attribute 2 track at start_time 1414 unless there is inconsistency in the GOP structure. However, when there is inconsistency in the GOP structure as shown in FIG. 14, and the asset group for the attribute 2 track is received from 1414, it is not possible to decode P frames and B frames after 1414.

Accordingly, the receiving apparatus determines a new packet processing pipeline to be able to receive an MMTP packet including a previous I frame in the asset group for the attribute 2 track, i.e., an MMTP packet for the attribute 2 track at sending_time 1413.

Once the new packet processing pipeline is determined, the transmitting apparatus may transmit an updated MP table and an HRBM before the sending_time and based on this, the receiving apparatus may receive an MMTP packet including an I frame for the attribute 2 track at the sending_time 1413.

Figure 15:
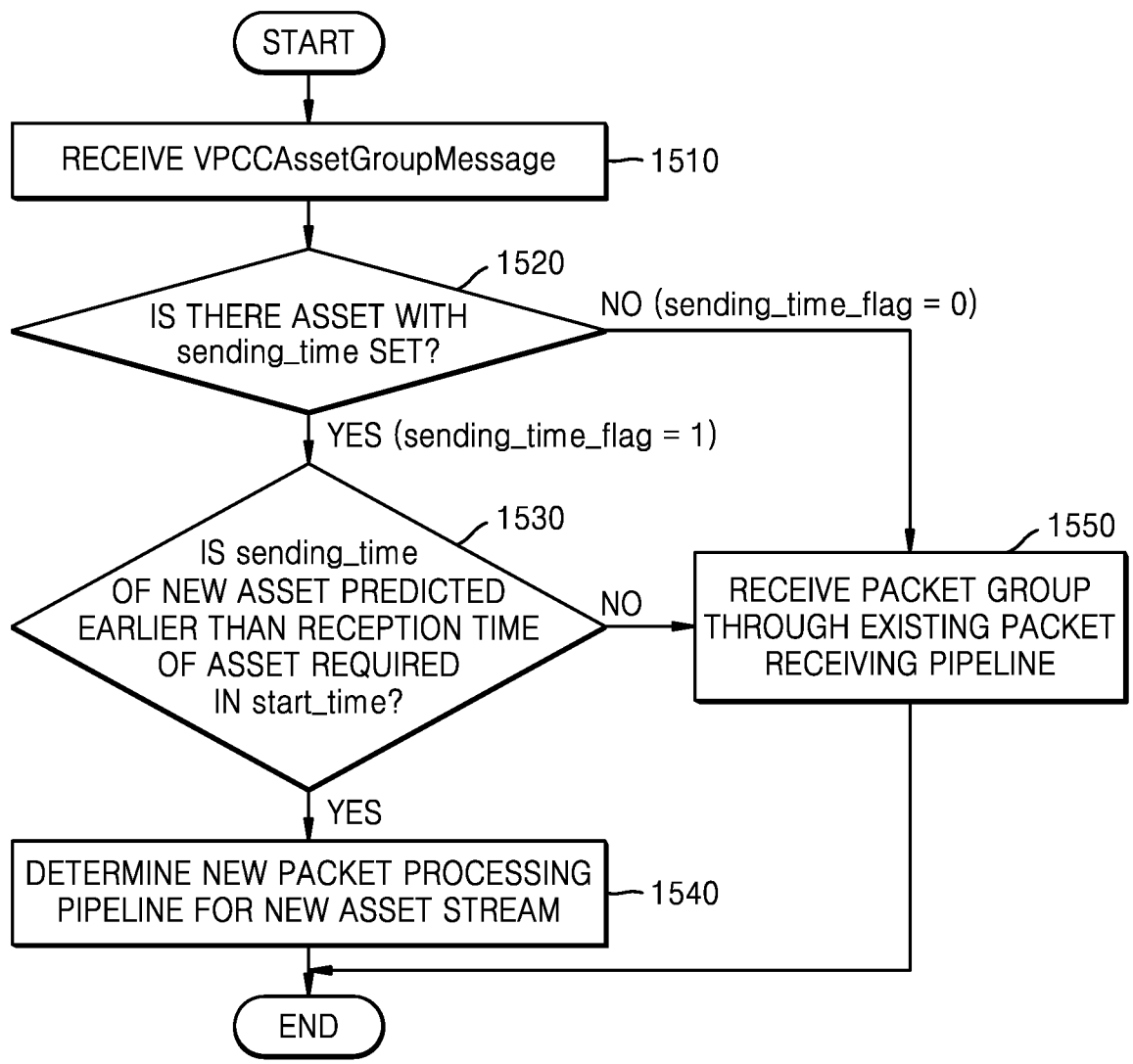
FIG. 15 is a flowchart of operations of a method by which a receiving entity determines a packet processing pipeline according to an embodiment of the disclosure.

FIG. 15 is a flowchart of operations of a method by which a receiving apparatus determines a packet processing pipeline according to an embodiment of the disclosure.

Referring to FIG. 15, when VPCCAssetGroupMessage is received in operation 1510, a receiving apparatus (a client or an MMT receiving entity) may determine whether there is an asset in which sending_time is set from the VPCCAsset-GroupMessage in operation 1520. In this case, whether there is an asset with the set sending_time may be determined from sending_time_flag.

When the sending_time_flag is 1, i.e., there is an asset including the sending_time, the receiving apparatus may determine whether sending_time of a new asset will be predicted earlier than reception time of an asset required in start time, in operation 1530.

When it is determined that the sending_time of a new asset will be predicted earlier than the reception time of the asset required in the start_time in operation 1530, a new packet processing pipeline for a new asset stream is determined (prepared), in operation 1540. Specifically, the receiving apparatus determines the new packet processing pipeline for the new asset stream before the start_time to be able to receive and decode the new stream of asset before the start_time.

When it is determined that the sending_time_flag is 0, meaning that there is no asset including sending_time in operation 1520, or when it is determined that the sending_time of a new asset will not be predicted earlier than the reception time of the asset required in the start_time in operation 1530, the receiving apparatus may receive a packet group via the existing packet receiving pipeline without preparing a new packet processing pipeline for a new asset stream until the MPT is renewed or updated in operation 1550.

Figure 16:
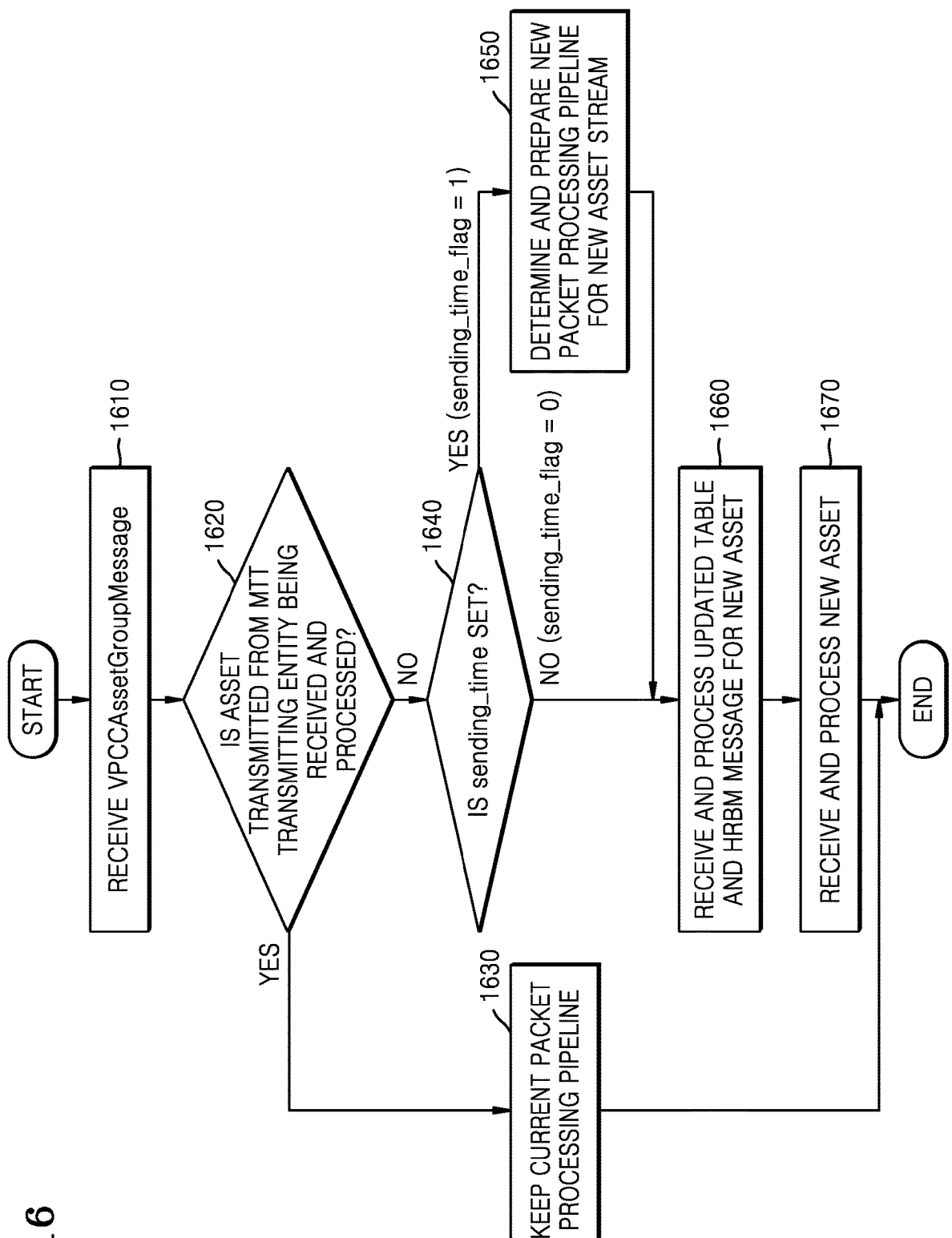
FIG. 16 is a flowchart of operations of a method by which a receiving entity configures a packet processing pipeline when asset switching occurs according to an embodiment of the disclosure.

FIG. 16 is a flowchart of operations of a method by which a receiving apparatus configures a packet processing pipeline when asset switching occurs according to an embodiment of the disclosure.

Referring to FIG. 16, When VPCCAssetGroupMessage is received in operation 1610, a receiving apparatus (a client or an MMT receiving entity) may determine whether assets specified as being actively transmitted by a transmitting apparatus (a server or an MMT transmitting entity) are already being received and processed in operation 1620. Whether the transmitting apparatus is actively transmitting the asset may be determined based on asset_id and associated state_flag.

When it is determined that the asset is already received and processed by the MMT receiving apparatus in operation 1620, the receiving apparatus may keep the current packet processing pipeline in operation 1630.

Otherwise, when it is determined that the asset is not received and processed in operation 1620, it may be determined whether the associated sending_time is set in operation 1640.

When it is determined that sending_time_flag is set to 1, i.e., the sending_time is set in operation 1640, the receiving apparatus may determine a new packet processing pipeline for a new asset stream in operation to prepare reception and processing of the new asset stream in operation 1650. The new packet processing pipeline is determined based on parameters of the same data type as the asset being currently received.

When it is determined that the sending_time_flag is set to 0, i.e., the sending_time is not set in operation 1640, the receiving apparatus receives and processes an updated MP table and an HRBM message for a new asset in operation 1660, and receives and processes the new asset through the existing packet may process pipeline or the new packet processing pipeline in operation 1670.

As described above, among application message types, a VPCCCSelectionFeedback message is a message used by the receiving apparatus to request a subset of a VPCC data type asset in the asset list provided from the transmitting apparatus.

The receiving apparatus may be aware of a total sets of assets available at the transmitting entity and a delivery state of the asset (whether or not the asset is being currently received) through the VPCCAssetGroupMessage, and may request another combination of sets of assets from the transmitting apparatus based on switching_mode.

Table 7 represents syntax of VPCCCSelectionFeedback.

TABLE 7

| Syntax | Values | No. of bits | Mnemonic |
|---|---|---|---|
| Application ( ){ | | | |
|   message_id | | 16 | |
|   version | | 8 | |
|   length | | 16 | |
|   application_identifier( ) | | | uimsbf |
|   if (application_identifier = = "urn:mpeg:mmt:app:vpcc:2019") | | | |
|     { | | 8 | |
|     app_message_type | | | |
|     if (app_message_type = = 0x02) { | N1 | 8 | |
|     num_selected_asset_groups | | | |
|     for (i=0; <N1; i+ +){ | | 16 | |
|       asset_group_id | "1111" | 4 | |
|       reserved | | 4 | |
|       switching_mode | N2 | 16 | |
|       num_asset_id | | | |
|       if(switching_mode = 0x1 || 0x2){ | | | |
|         for (j=0; j<N2; j+ +) { | | 16 | |
|           asset_id | | | |
|         } | | | |
|       } | | | |
|     } | | | |
|   } | | | |
|   } | | | |
| } | | | | message_id indicates an identifier of a VPCC application message.

version indicates a version of the VPCC application message.

length indicates length of the VPCC application message in bytes, counting from the beginning of the next field to the last byte of the message. The value of this field needs not to be equal to '0'.

application_identifier indicates an application identifier as an urn that uniquely identifies an application to consume the content of this message.

app_message_type defines an application-specific message type provided in Table 5, and the length of this field is 8 bits.

num_selected_asset_groups indicates the number of asset groups for which there is an associated state change request by the receiving entity.

asset_group_id indicates an identifier of the asset group associated with a V-PCC content.

switching_mode indicates a switching mode used for selection of assets as requested by the receiving entity.

Table 8 represents switching modes and their definitions depending on switching_mode field values.

TABLE 8

| Value | Switching mode | Definitinon of switching mode |
|---|---|---|
| 0x1 | Refresh | For each asset listed as specified by its asset_id, its state_flag will be set to "1", and the state_flag for all other non-listed assets of the same data_type will be set to "0". The states for assets of other non listed data types will remain unchanged. |

TABLE 8-continued

| Value | Switching mode | Definitinon of switching mode |
|---|---|---|
| 0x2 | Toggle | For each asset listed as specified by its asset_id, its state_flag will be changed (to "1", if originally "0", to "0" if originally "1"). The states for all non listed assets will remain unchanged |
| 0x3 | Send all | For the specified asset group, all associated assets within the group have their state_flag set to "1". |
| 0x4~0xF | Reserved | Reserved | num_asset_id indicates the number of asset ids signaled for a state change according to a specified switching mode.

asset_id indicates an identifier for an asset whose state is to be changed according to a specified switching mode.

Table 9 is for describing operations of a transmitting entity according to switching modes according to an embodiment of the disclosure.

TABLE 9

| Asset | state_flag (before switching) | state_flag (after switching) | [switching_mode; asset_id] |
|---|---|---|---|
| Attribute 1 | 1 | 0 | [refresh; attribute 2] or [toggle; attribute 1, attribute 2] |
| Attribute 2 | 0 | 1 | |

In Table 9, a first column represents assets, second and third columns represent state_flag of each asset before and after switching, and the last column represents a switching mode and an asset ID of a VPCCCSelectionFeedback message.

Referring to Table 9, in a situation where the receiving apparatus is receiving the attribute 1 asset stream, the receiving apparatus is to stop receiving the attribute 1 asset stream and to receive the attribute 2 asset stream. In this case, the receiving apparatus may select [switching_mode, asset_id] of the VPCCCSelectionFeedback message to be [fresh, attribute 2] or [toggle, attribute 1] and request the transmitting apparatus to transmit an asset of the attribute 2 asset stream.

Table 10 is for describing operations of a transmitting entity according to switching modes according to another embodiment of the disclosure.

TABLE 10

| Asset | state_flag (before switching) | state_flag (after switching) | [switching_mode; asset_id] |
|---|---|---|---|
| Attribute 1 | 1 | 1 | [send all] |
| Attribute 2 | 0 | 1 | |

In Table 10, a first column represents assets, second and third columns represent state_flag of each asset before and after switching, and the last column represents a switching mode and an asset ID of a VPCCCSelectionFeedback message.

Referring to Table 10, in a situation where the receiving apparatus is receiving the attribute 1 asset stream, the receiving apparatus is to continue to receive the attribute 1 asset stream and at the same time, to receive the attribute 2 asset stream. In this case, the receiving apparatus may select [switching_mode] of the VPCCCSelectionFeedback message to be [send all] and request the transmitting apparatus to transmit an asset of the attribute 2 asset stream.

Figure 17:
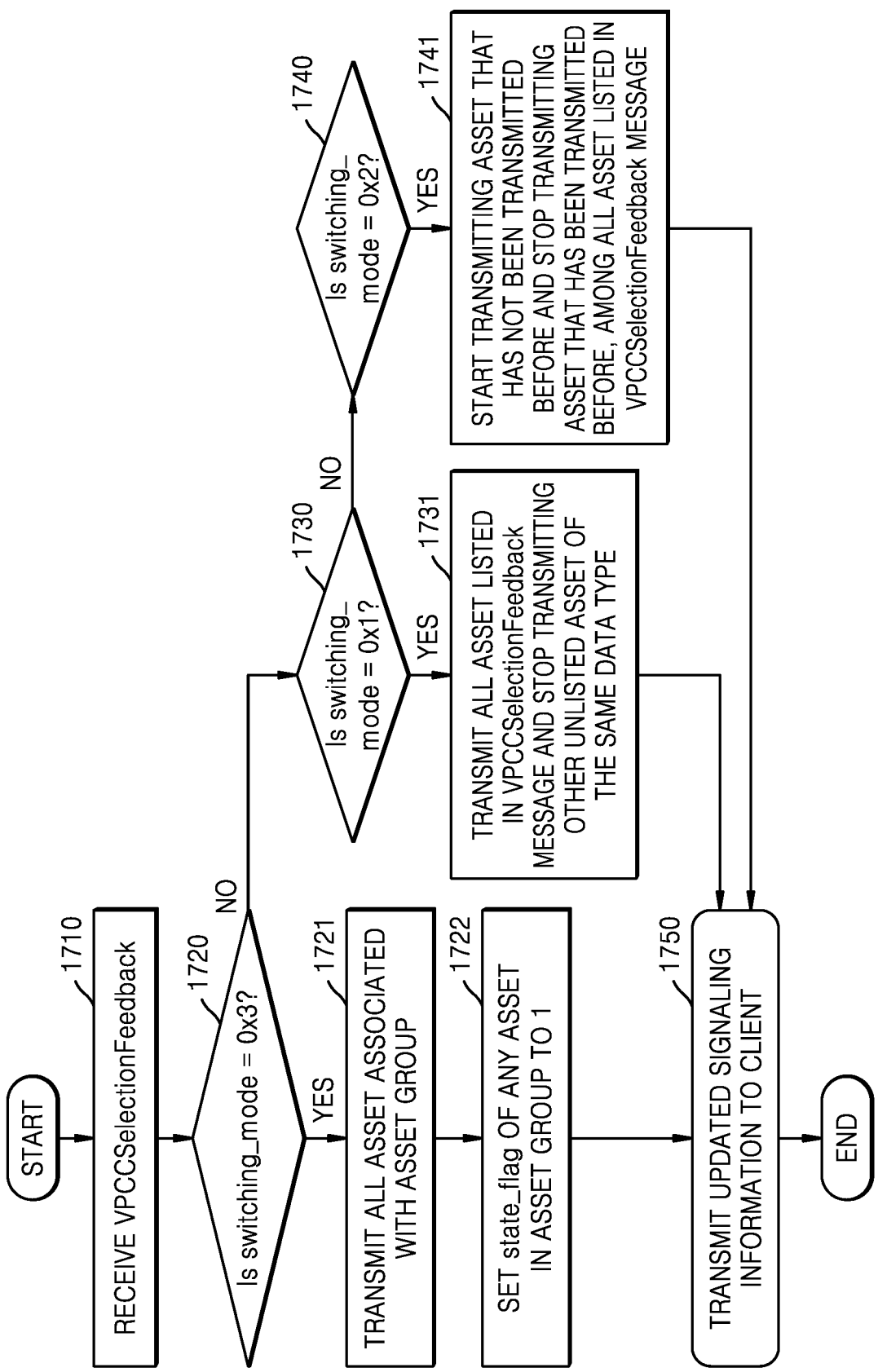
FIG. 17 is a flowchart of operations of a transmitting entity when a request for asset selection is received from a receiving entity according to an embodiment of the disclosure.

FIG. 17 is a flowchart of operations of a transmitting apparatus when a request for asset selection is received from a receiving apparatus according to an embodiment of the disclosure.

Referring to FIG. 17, when a VPCCCSelectionFeedback message is received from a receiving apparatus (a client or an MMT receiving entity) in operation 1710, a transmitting apparatus (a server or an MMT transmitting entity) may determine a switching mode for each asset group specified according to asset_group_id, in operation 1720.

When it is determined that switching_mode is 0x3, i.e., "send all" in operation 1720, the transmitting apparatus may transmit all assets associated with the asset group to the client in operation 1721 and set state_flag of all the assets in the asset group in VPCCAssetGroupMessage to 1 in operation 1722. Subsequently, the transmitting apparatus may transmit updated signaling information, e.g., VPCCAssetGroupMessage, an MP table and an HRBM message, to the receiving apparatus in operation 1750.

updated signaling information, e.g., VPCCAssetGroupMessage, an MP table and an HRBM message, to the receiving apparatus in operation 1750.

When it is determined that switching_mode is not 0x1 in operation 1730, the transmitting apparatus may determine whether the switching_mode is 0x2 in operation 1740. When the switching_mode is 0x2, i.e., "toggle", the transmitting apparatus may start transmitting assets that have not been transmitted before to the receiving apparatus and stop transmitting the assets that have been set to be transmitted before to the receiving apparatus, among all assets listed in the VPCCCSelectionFeedback message in operation 1741. The transmitting apparatus may also change the state_flag in the VPCCAssetGroupMessage to an alternative value (e.g., 0 to 1, or 1 to 0). Subsequently, the transmitting apparatus may transmit updated signaling information, e.g., VPCCAssetGroupMessage, an MP table and an HRBM message, to the receiving apparatus in operation 1750.

Table 11 represents syntax of VPCCAssetGroupMessage according to another embodiment of the disclosure.

TABLE 11

| Syntax | Values | No. of bits | Mnemonic |
|---|---|---|---|
| Application ( ) { | | | |
|     message_id | | 16 | |
|     version | | 8 | |
|     length | | 16 | |
| application_identifier( ) | | | uimsbf |
|     if (application_identifier == "urn:mpeg:mmt:app:vpcc:2019") | | | |
|     { | | | |
|         app_message_type | | 8 | |
|         if (app_message_type == 0x01) { | | | |
|             num_vpcc_asset_groups | N1 | 8 | |
|             for (i=0; i<N1; i++) { | | | |
|                 asset_group_id | | 16 | |
|                 num_assets | N2 | 16 | |
|                 start_mpu_seq_num | | 32 | |
|                 for (j=0; j<N2; j++) { | | | |
|                     data_type | | 8 | |
|                     reserved | "1111" | 4 | |
|                     is_pcm | | 1 | |
|                     is_single_layer | | 1 | |
|                     state_flag | | 1 | |
|                     sending_time_flag | | 1 | |
|                     if (sending_time_flag) { | | | |
|                         sending_time | | 32 | |
|                     } | | | |
|                     asset_id | | | |
|                 } | | | |
|             } | | | |
|         } | | | |
|     } | | | |
| } | | | |

When it is determined that switching_mode is not 0x3 in operation 1720, the transmitting apparatus may determine whether the switching_mode is 0x1 in operation 1730. When the switching_mode is 0x1, i.e., "refresh", the transmitting apparatus may transmit all assets listed in a VPCCCSelectionFeedback message and stop transmitting other data types of assets not listed in the asset group, in operation 1731. In this case, the transmitting apparatus may set state_flag of the corresponding assets in the VPCCAssetGroupMessage to 1 and set state_flag of those whose transmission is stopped to 0. Subsequently, the transmitting apparatus may transmit A validation point of this message may be signaled by a sequence number of the MPU including VPCC metadata.

start_mpu_seq_num indicates a sequence number of an MPU containing VPCC metadat (data_type=0x01) from which states of assets listed in this message are applicable. A presentation may be configured based on start_mpu_seq_num instead of start_time.

Table 12 represents syntax of VPCCAssetGroupMessage according to another embodiment of the disclosure.

TABLE 12

| Syntax | Values | No. of bits | Mnemonic |
|---|---|---|---|
| Application ( ) { | | | |
|     message_id | | 16 | |
|     version | | 8 | |
|     length | | 16 | |
| application_identifier( ) | | | uimsbf |
|     if (application_identifier == "urn:mpeg:mmt:app:vpcc:2019") | | | |
|     { | | | |
|       app_message_type | | 8 | |
|         if (app_message_type == 0x01) { | | | |
|           num_vpcc_asset_groups | N1 | 8 | |
|           for (i=0: i<N1; i++) { | | | |
|             asset_group_id | | 16 | |
|             num_assets | N2 | 16 | |
|             start_time | | 32 | |
|             for (j=0; j<N2; j++) { | | | |
|               data_type | | 8 | |
|               reserved | "111" | 3 | |
|               is_pcm | | 1 | |
|               is_single_layer | | 1 | |
|               state_flag | | 1 | |
|               sending_time_flag | | 1 | |
|               packet_id_flag | | 1 | |
|               asset_id | | Var | |
|               if (sending_time_flag){ | | | |
|                 sending_time | | 32 | |
|               } | | | |
|               if (packet_id_flag) { | | | |
|                 packet_id | | 16 | |
|               } | | | |
|             } | | | |
|           } | | | |
|         } | | | |
|     } | | | |
| } | | | |

A validation point of this message may be signaled by a sequence number of the MPU including VPCC metadata.

packet_id_flag is a flag indicating presence of a packet_id for the associated asset.

Packet_id indicates a value of a pakcet_id field in an MMTP packet header carrying the associated asset.

It is assumed that in a situation where the transmitting apparatus is able to provide two attributes for VPCC, i.e., attribute 1 and attribute 2, a receiving apparatus that has been receiving asset streams for the attribute 1 requests a change to asset streams for the attribute 2.

According to a first embodiment of the disclosure, the transmitting apparatus may allocate separate packet_id for the attribute 2 asset stream to generate an MMTP subflow, and inform the receiving apparatus of this using an MP table. Furthermore, the transmitting apparatus generates and transmits an HRBM for a new MMTP subflow. The receiving apparatus configures a pipeline for processing the attribute 2 by receiving and processing such signaling messages. In this case, depending on GoP structures of the attributes 1 and 2, there may be a section where the two subflows are all transmitted.

According to a second embodiment of the disclosure, the transmitting apparatus keeps transmitting the attribute 2 using the MMTP subflow in which the attribute 1 has been transmitted. In this case, the same packet_id is used. The attribute 1 and the attribute 2 may be correctly switched based on sending_time.

Figure 18:
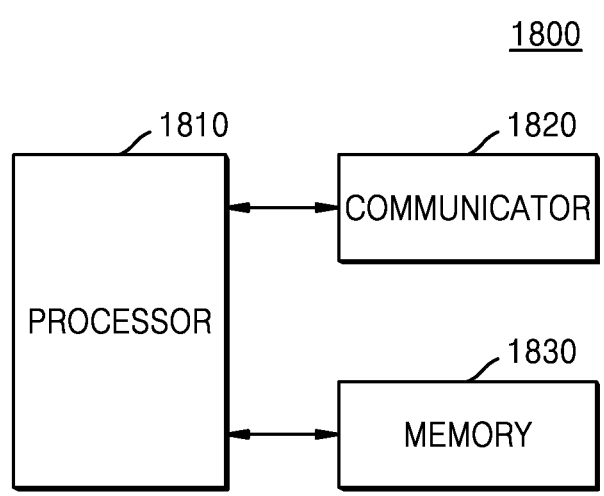
FIG. 18 is a block diagram of a transmitting entity according to an embodiment of the disclosure.

FIG. 18 is a block diagram of a transmitting apparatus according to an embodiment of the disclosure.

Referring to FIG. 18, an apparatus 1800 for transmitting VPCC data according to an embodiment of the disclosure may include a processor 1810, a communicator 1820, and a memory 1830.

The apparatus 1800 for transmitting VPCC data may be implemented as a part of encoder, and in FIG. 18, components related to embodiments of the disclosure are shown. Accordingly, those of ordinary skill in the art may understand that there may be other universal components in addition to those shown in FIG. 18.

The processor 1810 may control a series of processes for transmitting VPCC data as described above in connection with FIGS. 1 to 17.

The processor 1810 may also serve to control overall functions to control the apparatus 1800 for transmitting VPCC data. For example, the processor 1810 generally controls the apparatus 1800 for transmitting VPCC data by running programs stored in the memory 1330 in the apparatus 1800 for transmitting VPCC data. The processor 1810 may be implemented with a central processing unit (CPU), a graphics processing unit (GPU), an application processor (AP), and the like, equipped in the apparatus 1800 for transmitting VPCC data, without being limited thereto.

The communicator 1820 may connect the apparatus 1800 for transmitting VPCC data to another entity or module using a module for communication, such as wired or wireless local area network (LAN), and perform data transmission or reception.

The memory 1830 is hardware for storing various types of data to be processed in the apparatus 1800 for transmitting VPCC data. For example, the memory 1830 may store data received from the communicator 1820, data processed by the processor 1810, and data to be processed by the processor 1810.

The memory 1830 may include a random access memory (RAM), such as a dynamic RAM (DRAM) and a static RAM (SRAM), a read-only memory (ROM), an electrically erasable programmable ROM (EEPROM), a compact disc (CD)

ROM (CD-ROM), a blue ray or other optical disc storage, a hard disk drive (HDD), a solid state drive (SSD), or a flash memory.

Figure 19:
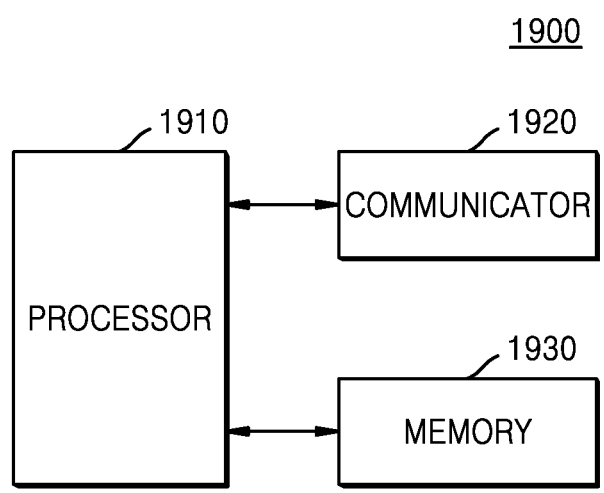
FIG. 19 is a block diagram of a receiving entity according to an embodiment of the disclosure.

FIG. 19 is a block diagram of a receiving apparatus according to an embodiment of the disclosure.

Referring to FIG. 19, an apparatus 1900 for receiving VPCC data according to an embodiment of the disclosure may include a processor 1910, a communicator 1920, and a memory 1930.

The apparatus 1900 for receiving VPCC data may be implemented as a part of decoder, and in FIG. 19, components related to embodiments of the disclosure are shown. Accordingly, those of ordinary skill in the art may understand that there may be other universal components in addition to those shown in FIG. 19.

The processor 1910 may control a series of processes for receiving VPCC data as described above in connection with FIGS. 1 to 17.

The processor 1910 may also serve to control overall functions to control the apparatus 1900 for receiving VPCC data. For example, the processor 1910 generally controls the apparatus 1900 for receiving VPCC data by running programs stored in the memory 1930 in the apparatus 1900 for receiving VPCC data. The processor 1910 may be implemented with a CPU, a GPU, an AP, and the like, equipped in the apparatus 1900 for receiving VPCC data, without being limited thereto.

The communicator 1920 may connect the apparatus 1900 for receiving VPCC data to another entity or module using a module for communication, such as wired or wireless LAN, and perform data transmission or reception.

The memory 1930 is hardware for storing various types of data to be processed in the apparatus 1900 for receiving VPCC data. For example, the memory 1930 may store data received from the communicator 1920, data processed by the processor 1910, and data to be processed by the processor 1910.

The memory 1930 may include a RAM, such as a DRAM and an SRAM, a ROM, an EEPROM, a CD-ROM, a blue ray or other optical disc storage, an HDD, an SSD, or a flash memory.

Methods according to the claims of the disclosure or the embodiments described in the specification may be implemented in hardware, software, or a combination of hardware and software.

When implemented in software, a computer-readable storage medium or computer program product storing one or more programs (software modules) may be provided. The one or more programs stored in the computer-readable storage medium or computer program product are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an EEPROM, a magnetic disc storage device, a CD-ROM, a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a LAN, a wide LAN (WLAN), or a storage area network (SAN), or a combination thereof. The storage device may be connected to an apparatus performing the embodiments of the disclosure through an external port. Furthermore, an extra storage device in the communication network may access a device that performs the embodiments of the disclosure.

In the disclosure, the term 'computer program product' or 'computer-readable recording medium' is used to generally indicate a medium, such as a memory, a hard disc installed in a hard disc drive, and a signal. The "computer program product" or "computer-readable recording medium" is to provide software including instructions to set length of a timer for receiving a missing data packet based on a network metric corresponding to an event determined according to the disclosure to a computer system.

The machine-readable storage medium may be provided in the form of a non-transitory storage medium. The term 'non-transitory' storage medium may mean that the storage medium is a tangible device which does not include a signal, e.g., electromagnetic waves, without distinguishing between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Play Store™), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device, such as a server of the manufacturer, a server of the application store, or a relay server.

According to the disclosure, by defining an asset group message, asset streams for an ISOBMFF file including VPCC may be grouped by data type and a data type of an asset group may be determined without extra parsing. Furthermore, a receiving entity may request a transmitting entity to transmit a selected asset group.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a server, of transmitting video-based point cloud contents (VPCC) data, the method comprising:

generating moving picture experts group (MPEG) media transport protocol (MMTP) packets including at least one asset for the VPCC data;

generating a signaling message including an asset group message about the at least one asset, the at least one asset constituting each data track, grouped in a multi-component single media type to identify requirements at an MPEG media transport (MMT) packet level, and the asset group message including information about each asset group; and transmitting the MMTP packets and the signaling message including the asset group message to a client.

2. The method of claim 1, wherein the asset group message comprises at least one of information about a number of at least one asset group, identification information of each of the at least one asset group, information about a number of at least one asset included in each of the at least one asset group, presentation time information of each of the at least one asset group, data type information of each of the at least one asset included in each of the at least one asset group, transmission state information of each of the at least one asset included in each of the at least one asset group, transmission time information of a first MMTP packet including a first MMT processing unit (MPU) of each of the at least one asset group, or identification information of each of the at least one asset included in each of the at least one asset group.

3. The method of claim 1, further comprising receiving a signaling message including an asset selection message from the client.

4. The method of claim 3, wherein the asset selection message comprises at least one of information about a number of at least one selected asset group, identification information of each of the at least one selected asset group, switching mode information of each of the at least one selected asset group, information about a number of at least one switching target asset determined according to a switching mode, or identification information of the at least one switching target asset.

5. The method of claim 3, further comprising delivering MMTP packets including an asset requested for transmission, based on the asset selection message and the asset group message.

6. A method, performed by a client, of receiving video-based point cloud contents (VPCC) data, the method comprising:

receiving moving picture experts group (MPEG) media transport protocol (MMTP) packets including at least one asset for the VPCC data and a signaling message including an asset group message about the at least one asset from a server, the at least one asset constituting each data track, grouped in a multi-component single media type to identify requirements at an MPEG media transport (MMT) packet level, and the asset group message including information about each asset group; and processing the MMTP packets, based on the signaling message.

7. The method of claim 6, further comprising:
determining whether to update a packet process pipeline, based on the asset group message; and
when the packet process pipeline is determined to be updated, the method further comprising:
updating the packet processing pipeline,
receiving new MMTP packets through the updated packet processing pipeline, and
processing the received new MMTP packets, based on the updated packet processing pipeline.

8. The method of claim 6, further comprising transmitting a signaling message including an asset selection message to the server.

9. The method of claim 8, further comprising receiving MMTP packets including an asset selected based on the asset selection message.

10. An apparatus for transmitting video-based point cloud contents (VPCC) data, the apparatus comprising:
a communicator;
at least one memory storing one or more instructions; and
at least one processor executing the one or more instructions,
wherein the at least one processor is configured to:
generate moving picture experts group (MPEG) media transport protocol (MMTP) packets including at least one asset for the VPCC data,
generate a signaling message including an asset group message about the at least one asset, the at least one asset constituting each data track, grouped in a multi-component single media type to identify requirements at an MPEG media transport (MMT) packet level, and the asset group message including information about each asset group, and
control the communicator to transmit the MMTP packets and the signaling message including the asset group message to a client.

11. The apparatus of claim 10, wherein the at least one processor is further configured to control the communicator to receive a signaling message including an asset selection message from the client.

12. An apparatus for receiving video-based point cloud contents (VPCC) data, the apparatus comprising:
a communicator;
at least one memory storing one or more instructions; and
at least one processor executing the one or more instructions,
wherein the at least one processor is configured to:
control the communicator to receive moving picture experts group (MPEG) media transport protocol (MMTP) packets including at least one asset for the VPCC data and a signaling message including an asset group message about the at least one asset from a server, the at least one asset constituting each data track, grouped in a multi-component single media type to identify requirements at an MPEG media transport (MMT) packet level, and the asset group message including information about each asset group, and
process the MMTP packets based on the signaling message.

13. The apparatus of claim 12, wherein the at least one processor is further configured to:
generate a signaling message including an asset selection message, and
control the communicator to transmit the asset selection message to the server.

14. The apparatus of claim 13, wherein the asset selection message comprises at least one of information about a number of at least one selected asset group, identification information of each of the at least one selected asset group, switching mode information of each of the at least one selected asset group, information about a number of at least one switching target asset determined according to a switching mode, or identification information of the at least one switching target asset.

15. The apparatus of claim 12, wherein the asset group message comprises at least one of information about a number of at least one asset group, identification information of each of the at least one asset group, information about a number of at least one asset included in each of the at least one asset group, presentation time information of each of the at least one asset group, data type information of each of the at least one asset included in each of the at least one asset group, transmission state information of each of the at least one asset included in each of the at least one asset group, transmission time information of a first MMTP packet including a first MMT processing unit (MPU) of each of the at least one asset group, or identification information of each of the at least one asset included in each of the at least one asset group.

16. At least one non-transitory computer-readable recording medium having recorded thereon computer programs for performing the method of claim 1.

17. At least one non-transitory computer-readable recording medium having recorded thereon computer programs for performing the method of claim 6.

* * * * *